(12) United States Patent
Kawamura et al.

(10) Patent No.: US 10,253,843 B2
(45) Date of Patent: Apr. 9, 2019

(54) VIBRATION REDUCTION APPARATUS OF HYBRID VEHICLE

(71) Applicant: Honda Motor Co., Ltd., Tokyo (JP)

(72) Inventors: Keisuke Kawamura, Wako (JP); Masato Shigenaga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 15/695,708

(22) Filed: Sep. 5, 2017

(65) Prior Publication Data

US 2018/0073593 A1  Mar. 15, 2018

(30) Foreign Application Priority Data

Sep. 14, 2016 (JP) ................ 2016-179053

(51) Int. Cl.
*F16F 15/131* (2006.01)
*F16D 21/06* (2006.01)
*F16H 57/00* (2012.01)

(52) U.S. Cl.
CPC ........ *F16F 15/13121* (2013.01); *F16D 21/06* (2013.01); *F16H 57/0006* (2013.01); *F16D 2021/063* (2013.01); *F16D 2300/22* (2013.01); *Y02T 10/6221* (2013.01); *Y02T 10/6286* (2013.01); *Y02T 10/7077* (2013.01); *Y02T 10/7275* (2013.01)

(58) Field of Classification Search
CPC ............... F16F 15/13121; F16D 2021/063
See application file for complete search history.

(56) References Cited

U.S. PATENT DOCUMENTS 9,657,783 B2 * 5/2017 Trent ................ F16D 13/74
2018/0029601 A1 * 2/2018 Goppert ............. F16D 48/06

FOREIGN PATENT DOCUMENTS

JP   2010076543 A   4/2010

* cited by examiner

*Primary Examiner* — Derek D Knight
(74) *Attorney, Agent, or Firm* — Duft & Bornsen, PC

(57) ABSTRACT

A vibration reduction apparatus of a hybrid vehicle includes a differential rotation detector configured to detect a difference between a rotational speed of an output shaft of a prime mover and a rotational speed of a second rotating shaft, and controller configured to control a driving part and an electric motor so as to switch an operation mode from a first mode where a torque of the prime mover is output to an electric motor and a third shaft to a second mode where torque of the prime mover and the electric motor is output to the third shaft, when the difference detected by the differential rotation detector in the first mode is within a predetermined range continuously for a predetermined time.

8 Claims, 16 Drawing Sheets

US 10,253,843 B2

VIBRATION REDUCTION APPARATUS OF HYBRID VEHICLE

CROSS-REFERENCE TO RELATED APPLICATION

This application is based upon and claims the benefit of priority from Japanese Patent Application No. 2016-179053 filed on Sep. 14, 2016, the content of which is incorporated herein by reference.

BACKGROUND OF THE INVENTION

Field of the Invention

This invention relates to a vibration reduction apparatus of a hybrid vehicle configured to reduce vibration caused by differential rotation between clutch input and output shafts.

Description of the Related Art

Conventionally, hybrid vehicles equipped with an engine and a motor (motor-generator) as power sources are known, which include an apparatus including first and second clutches and adapted to transmit torque of the engine through the first clutch to odd-numbered speed stages and through the second clutch to even-numbered speed stages. As an apparatus of this type, Japanese Unexamined Patent Publication No. 2010-076543 (JP2010-076543A), for example, describes an apparatus in which, when vehicle drive-off and rechargeable battery charging are performed simultaneously, engine torque is transmitted through the second clutch to a second speed gear to start the vehicle in second gear and engine torque is transmitted through the first clutch to the motor-generator to charge the rechargeable battery (secondary battery).

In this case, vibration caused by differential rotation between clutch input and output shafts tends to occur at start of clutch engagement during vehicle drive-off, and resonance of the vehicle body due to this vibration must be avoided. However, when the motor-generator is used for battery charging during vehicle drive-off as in the apparatus described in JP2010-076543A, the motor-generator is disconnected from the travelling drive system. Therefore, resonance of the vehicle body is apt to occur because eigenvalue (eigen frequency) of the travelling drive system increases.

SUMMARY OF THE INVENTION

An aspect of the present invention is a vibration reduction apparatus of a hybrid vehicle, including: a prime mover; a first shift mechanism including a first rotating shaft and a plurality of gears contained in a first gear group, and configured to output a rotation of the first rotating shaft to a third rotating shaft through any of the plurality of gears contained in the first gear group to shift a gear ratio; a second shift mechanism including a second rotating shaft and a plurality of gears contained in a second gear group, and configured to output a rotation of the second rotating shaft to the third rotating shaft through any of the plurality of gears contained in the second gear group to shift the gear ratio; a first clutch configured to connect or disconnect an output shaft of the prime mover and the first rotating shaft to transmit or non-transmit a torque of the prime mover to the first rotating shaft; a second clutch configured to connect or disconnect the output shaft of the prime mover and the second rotating shaft to transmit or non-transmit the torque of the prime mover to the second rotating shaft; an electric motor connected to the first rotating shaft, the electric motor being capable of generating electricity; a driving part configured to drive the first shift mechanism, the second shift mechanism, the first clutch and the second clutch; a controller configured to control the driving part and the electric motor so that, in a first mode, the torque of the prime mover is output to the electric motor through the first rotating shaft and is output to the third rotating shaft through the second shift mechanism, and in a second mode, the torque of the prime mover is output to the third rotating shaft through the second shift mechanism and a torque of the electric motor is output to the third rotating shaft through the first shift mechanism; and a differential rotation detector configured to detect a difference between a rotational speed of the output shaft of the prime mover and a rotational speed of the second rotating shaft, wherein the controller controls the driving part and the electric motor so as to switch an operation mode from the first mode to the second mode, when the difference detected by the differential rotation detector in the first mode is within a predetermined range continuously for a predetermined time.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
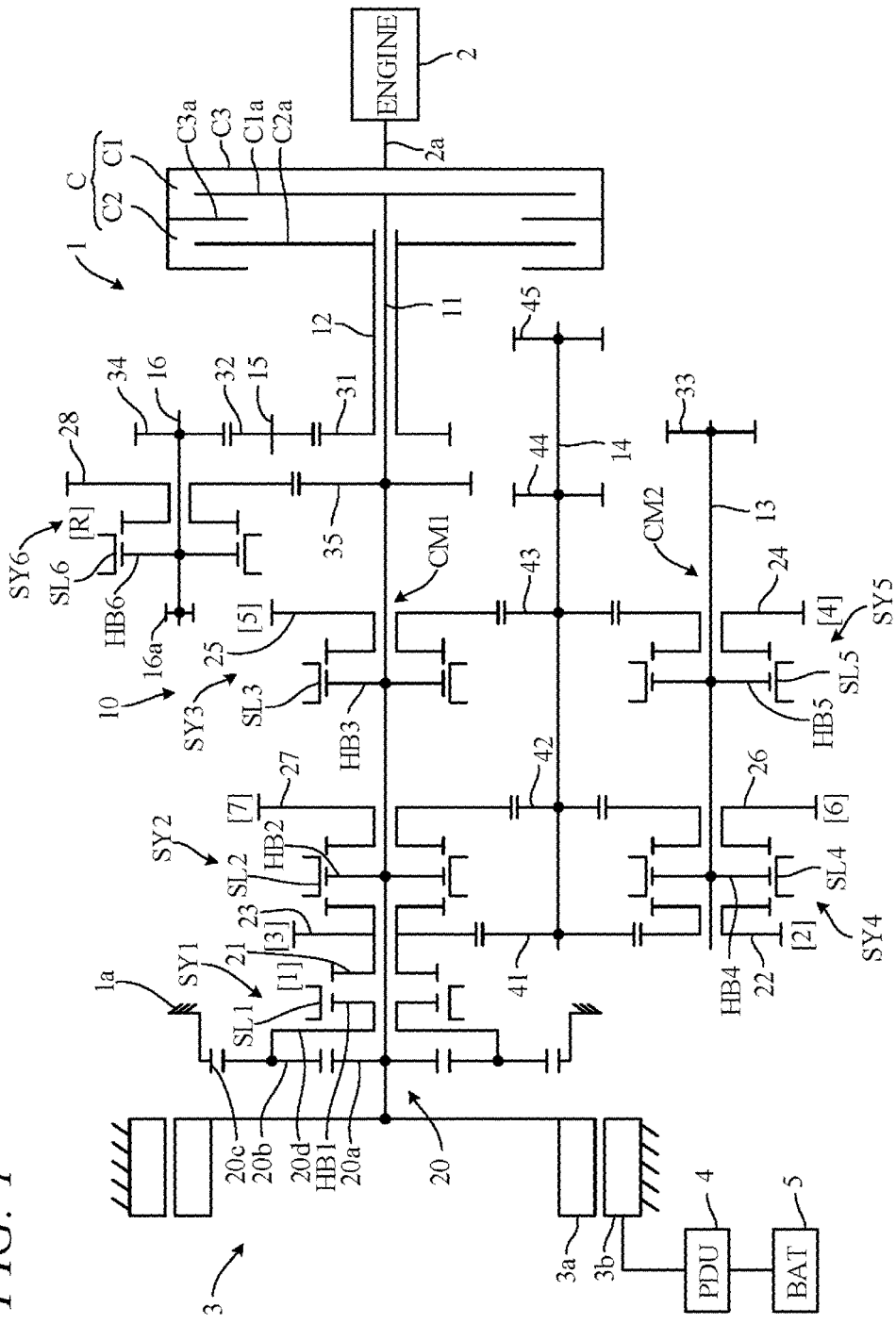
FIG. 1 is a skeleton diagram showing an overview of a travelling drive system of a hybrid vehicle to which a vibration reduction apparatus according to an embodiment of the present invention is applied.

Hereinafter, an embodiment of the present invention is explained with reference to FIGS. 1 to 16. FIG. 1 is a skeleton diagram showing an overview of a travelling drive system of a hybrid vehicle to which a vibration reduction apparatus according to an embodiment of the present invention is applied. As shown in FIG. 1, the hybrid vehicle is equipped with a transmission 1, an engine 2 and an electric motor 3. The hybrid vehicle is capable of engine-driving using only the engine 2 as a power source, motor-driving using only the electric motor 3 as a power source, and hybrid-driving using both the engine 2 and the electric motor 3 as power sources. Driving while charging a battery 5 (charge-driving) is also possible.

The transmission 1 has a gear mechanism 10 for shifting speed ratio of rotation of at least one of the engine 2 and the electric motor 3 in accordance with speed stages and a clutch mechanism C for transmitting or not transmitting torque of the engine 2 to the gear mechanism 10. Torque output through the gear mechanism 10 is transmitted to drive wheels through a differential gear mechanism, a drive shaft and so on (none of which are shown), thus driving the vehicle. Alternatively, torque of the engine 2 can be output to the transmission 1 through a torque converter. A damper for absorbing vibration of the engine 2 can be installed between the engine 2 and the clutch mechanism C.

The gear mechanism 10 has multiple rotatably supported rotating shafts arranged substantially in parallel with one another, namely, a first main input shaft 11, a second main input shaft 12, an auxiliary input shaft 13, an output shaft 14, an idler shaft 15, and a reverse shaft 16. The second main input shaft 12 is formed hollow so as to concentrically enclose the first main input shaft 11. The transmission 1 is, for example, an automatic transmission with seven forward speeds and one reverse speed.

The clutch mechanism C is, for example, constituted as a dry dual clutch including a first clutch C1 and a second clutch C2. The first clutch C1 and second clutch C2 respectively include clutch disks C1a and C2a disposed in a clutch housing C3 and separated by a plate C3a. The clutch housing C3 is fixed coaxially with an output shaft 2a of the engine 2.

Figure 5:
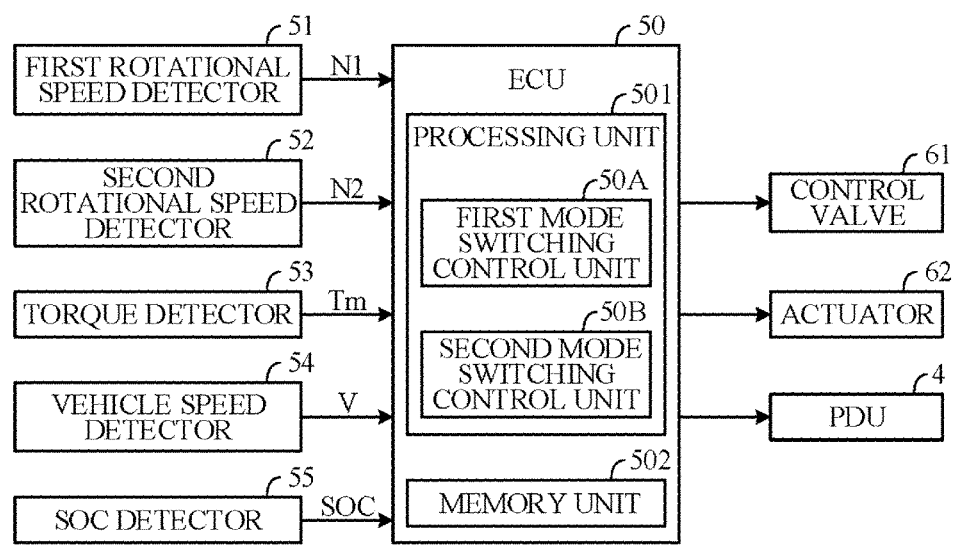
FIG. 5 is a block diagram showing main components of a vibration reduction apparatus according to the embodiment to the present invention.

The clutch disks C1a and C2a are pressed toward the plate in the clutch housing C3 by hydraulic force produced by pressure oil supplied from a hydraulic pump through control valves, such as an electromagnetic switching valve and a pressure adjusting valve (FIG. 5). The clutch disks C1a and C2a are thus engaged with the plate in the clutch housing C3 so as to rotate integrally with the clutch housing. On the other hand, when the hydraulic force is at or below a predetermined value, return spring (not shown) forces separate the clutch disks C1a and C2a from the plates in the clutch housing C3. This releases engagement of the clutch disks C1a and C2a with the plates in the clutch housing C3, and thus the clutch disks can rotate independently of the clutch housing C3.

The electric motor 3, which is a motor-generator that also functions as an electric generator, is, for example, constituted as a three-phase DC brushless motor. The electric motor 3 includes a rotor 3a rotatably supported inside a motor housing (not shown) and a stator 3b fixed on the motor housing to surround the rotor 3a. One end of the first main input shaft 11 is connected to the rotor 3a of the electric motor 3, and the first main input shaft 11 can rotate integrally with the rotor 3a.

The stator 3b includes a coil wound around a stator core, and the coil is electrically connected through a power drive unit (PDU) 4 to a battery (BAT) 5. Operation of the power drive unit 4 is controlled by an electronic control unit (ECU of FIG. 5). This enables torque produced by the electric motor 3 (motor torque) to be controlled by power from the battery 5 and input to the first main input shaft 11. During vehicle braking, regenerated energy can be input to the electric motor 3. Power generated by the electric motor 3 is supplied to and stored in the battery 5 through the power drive unit 4.

Another end of the first main input shaft 11 is connected through the first clutch C1 to an output shaft 2a of the engine 2. The first main input shaft 11 and output shaft 2a are connected and disconnected in accordance with engagement and disengagement of the first clutch C1. More specifically, when the first clutch C1 engages, the first main input shaft 11 and output shaft 2a are connected and torque from the engine 2 (engine torque) is input to the first main input shaft 11. On the other hand, when the first clutch C1 disengages, the first main input shaft 11 and output shaft 2a are disconnected and input of engine torque is cut off.

The first clutch C1 is a clutch for odd-numbered speed stages, and a first speed drive gear 21, a third speed drive gear 23, a fifth speed drive gear 25, and a seventh speed drive gear 27 are arranged around the first main input shaft 11. The drive gears 21, 23, 25 and 27 are supported on the outer peripheral surface of the first main input shaft 11 through associated bearings to be rotatable relative to the first main input shaft 11. The first speed drive gear 21 and the third speed drive gear 23 are provided to be integrally rotatable. An odd-numbered stage shift mechanism CM1 includes the first main input shaft 11 and the drive gears 21, 23, 25, and 27.

A planetary gear unit 20 is disposed between the rotor 3a of the electric motor 3 and the first speed drive gear 21. The planetary gear unit 20 includes a sun gear 20a fixed on the first main input shaft 11, a ring gear 20c installed around the sun gear 20a, a planetary gear 20b disposed between the sun gear 20a and the ring gear 20c and meshed with the sun gear 20a and the ring gear 20c, and a carrier 20d that rotatably supports the planetary gear 20b. The sun gear 20a and the carrier 20d are both mounted to be rotatable around the first main input shaft 11, and the ring gear 20c is fixed to a casing 1a of the transmission 1. Therefore, rotation of the sun gear 20a rotates the carrier 20d at a rotational speed proportional to the rotational speed of the sun gear 20a.

One end of the second main input shaft 12 is connected through the second clutch C2 to an output shaft 2a of the engine 2. The second main input shaft 12 and output shaft 2a are connected and disconnected in accordance with engagement and disengagement of the second clutch C2. More specifically, when the second clutch C2 engages, the second main input shaft 12 and output shaft 2a are connected, and engine torque is input to the second main input shaft 12. On the other hand, when the second clutch C2 disengages, the second main input shaft 12 and output shaft 2a are disconnected and input of engine torque is cut off.

A gear 31 is fixed on another end of the second main input shaft 12. The gear 31 meshes with an idler gear 32 fixed on the idler shaft 15, and the idler gear 32 meshes with a gear 33 fixed on the auxiliary input shaft 13. Torque of the second main input shaft 12 is therefore transmitted through the idler gear 32 to the auxiliary input shaft 13, whereby the auxiliary input shaft 13 rotates together with the second main input shaft 12.

The second clutch C2 is a clutch for even-numbered speed stages, and a second speed drive gear 22, a fourth speed drive gear 24, and a sixth speed drive gear 26 are arranged around the auxiliary input shaft 13. The drive gears 22, 24 and 26 are supported on the outer peripheral surface of the auxiliary input shaft 13 through associated bearings to be rotatable relative to the auxiliary input shaft 13. An even-numbered stage shift mechanism CM2 includes the auxiliary input shaft 13 and the drive gears 22, 24 and 26.

A gear 34 is fixed on one end of the reverse shaft 16. The gear 34 meshes with the idler gear 32, whereby torque of the second main input shaft 12 is input to the reverse shaft 16. A reverse drive gear 28 is supported on the outer peripheral surface of the reverse shaft 16 through a bearing so as to be rotatable relative to the reverse shaft 16. The reverse drive gear 28 meshes with a reverse driven gear 35 fixed on the first main input shaft 11 between the fifth speed drive gear 25 and the gear 31.

A second-third speed driven gear 41, a sixth-seventh speed driven gear 42, a fourth-fifth speed driven gear 43, a parking gear 44 and a final gear 45 are fixed on the output shaft 14. The second-third speed driven gear 41 meshes with the second speed drive gear 22 and the third speed drive gear 23. The sixth-seventh speed driven gear 42 meshes with the sixth speed drive gear 26 and the seventh speed drive gear 27. The fourth-fifth speed driven gear 43 meshes with the fourth speed drive gear 24 and the fifth speed drive gear 25.

The parking gear 44 engages an engaging pawl of a parking gear mechanism (not shown), and the gear mechanism 10 can be locked and unlocked in accordance with operation of the parking gear mechanism. Torque output from the transmission 1 is transmitted through the final gear 45 to the differential gear mechanism (not shown) and further to drive wheels.

The transmission 1 has a first speed synchronization mechanism SY1 that couples the first speed drive gear 21 rotatable with respect to the first main input shaft 11 to the first main input shaft 11, a third-seventh speed synchronization mechanism SY2 that couples one or the other of the third speed drive gear 23 and seventh speed drive gear 27 rotatable with respect to the first main input shaft 11 to the first main input shaft 11, a fifth speed synchronization mechanism SY3 that couples the fifth speed drive gear 25 rotatable with respect to the first main input shaft 11 to the first main input shaft 11, a second-sixth speed synchronization mechanism SY4 that couples one or the other of the second speed drive gear 22 and sixth speed drive gear 26 rotatable with respect to the auxiliary input shaft 13 to the auxiliary input shaft 13, a fourth speed synchronization mechanism SY5 that couples the fourth speed drive gear 24 rotatable with respect to the auxiliary input shaft 13 to the auxiliary input shaft 13, and a reverse synchronization mechanism SY6 that couples the reverse drive gear 28 rotatable with respect to the reverse shaft 16 to the reverse shaft 16.

The first speed synchronization mechanism SY1 includes a hub HB1 fixed to an outer peripheral surface of the carrier 20d of the planetary gear unit 20 and a substantially cylindrical sleeve SL1 disposed around the hub HB1. An outer peripheral surface of the hub HB1 and an inner peripheral surface of the sleeve SL1 are formed with dog teeth (splines), and the sleeve SL1 is supported via the dog teeth to be axially movable along the outer peripheral surface of the hub HB1. Dog teeth of the same outer diameter as the dog teeth of the hub HB1 are concentrically formed on an outer peripheral surface of the first speed drive gear 21.

The sleeve SL1 is moved axially through a fork (not shown) by operating an actuator (e.g., electric motor). When the sleeve SL1 is in neutral position as illustrated, the dog teeth of the sleeve SL1 separate from the dog teeth of the first speed drive gear 21. At this time, the hub HB1 is rotatable with respect to the first speed drive gear 21.

When the sleeve SL1 is driven from neutral position toward the first speed drive gear 21 and reaches a first speed in-gear position, the dog teeth of the sleeve SL1 mesh (go in gear) with the dog teeth of the first speed drive gear 21. As a result, the first speed drive gear 21 is coupled to the first main input shaft 11 through the sleeve SL1, hub HB1, carrier 20d and sun gear 20a, whereby the first speed drive gear 21 can rotate integrally with the first main input shaft 11.

When the first clutch C1 engages in this state, the first main input shaft 11 is rotated by engine torque. This rotation of the first main input shaft 11 is transmitted to the output shaft 14 through the sun gear 20a, planetary gear 20b, carrier 20d, hub HB1, first speed drive gear 21, third speed drive gear 23 and second-third speed driven gear 41, thus engine-driving the vehicle in first speed.

The third-seventh speed synchronization mechanism SY2, fifth speed synchronization mechanism SY3, second-sixth speed synchronization mechanism SY4, fourth speed synchronization mechanism SY5, and reverse synchronization mechanism SY6 are configured similarly to the first speed synchronization mechanism SY1. More exactly, the synchronization mechanisms SY2 to SY6 similarly include respective hubs HB2 to HB6 fixed on the first main input shaft 11 or the auxiliary input shaft 13, and sleeves SL2 to SL6 provided on outer peripheral surfaces of the hubs HB2 to HB6 to be axially moveable by means of dog teeth. In addition, the vehicle drives in predetermined speed stages in accordance with operation of the synchronization mechanisms SY2 to SY6.

For example, when the sleeve SL4 of the second-sixth speed synchronization mechanism SY4 moves from neutral position of FIG. 1 to a second speed in-gear position of one side in the axial direction where the dog teeth of the sleeve SL4 mesh with the dog teeth of the second speed drive gear 22, the second speed drive gear 22 couples to the hub HB4 through the sleeve SL4. This enables the second speed drive gear 22 to rotate integrally with the auxiliary input shaft 13. When the second clutch C2 engages in this state, the second main input shaft 12 is rotated by engine torque. This rotation of the second main input shaft 12 is transmitted to the output shaft 14 through the idler gear 32, gear 33, auxiliary input shaft 13, hub HB4, second speed drive gear 22, and second-third speed driven gear 41, thus engine-driving the vehicle in second speed.

Further, when the sleeve SL2 of the third-seventh speed synchronization mechanism SY2 moves from neutral position of FIG. 1 to a third speed in-gear position of one side in the axial direction where the dog teeth of the sleeve SL2 mesh with the dog teeth of the third speed drive gear 23, the third speed drive gear 23 couples to the hub HB2 through the sleeve SL2. This enables the third speed drive gear 23 to rotate integrally with the first main input shaft 11. When the first clutch C1 engages in this state, the first main input shaft 11 is rotated by engine torque. This rotation of the first main input shaft 11 is transmitted to the output shaft 14 through the hub HB2, third speed drive gear 23, and second-third speed driven gear 41, thus engine-driving the vehicle in third speed.

The transmission 1 according to the present embodiment includes the odd-numbered stage shift mechanism CM1 and the even-numbered stage shift mechanism CM2, and when a predetermined speed stage is established by one of the shift mechanisms, the other shift mechanism performs a so-called pre-shift by selecting a speed stage in accordance with required driving force. For example, when driving in an odd-numbered speed, a drive gear of an even-numbered speed stage in accordance with required driving force is meshed, and when driving in an even-numbered speed, a drive gear of an odd-numbered speed stage in accordance with required driving force is meshed. This enables speedy shifting.

The vehicle is capable not only of engine-driving but also of motor-driving and hybrid-driving. For example, in a state where the vehicle is engine-driving in second speed, when motor torque is input to the first main input shaft 11, the first main input shaft 11 is rotated by motor torque. If first speed stage is selected by a pre-shift at this time, i.e., if the sleeve SL1 moves to first speed in-gear position and the dog teeth of the sleeve SL1 mesh with the dog teeth of the first speed drive gear 21, rotation of the first main input shaft 11 is transmitted to the output shaft 14 through the sun gear 20a, planetary gear 20b, carrier 20d, hub HB1, first speed drive gear 21, third speed drive gear 23, and second-third speed driven gear 41. As a result, the vehicle is hybrid-driven in second speed by engine torque and by motor torque through the first speed drive gear 21.

Moreover, if third speed stage is selected by a pre-shift in a state where the vehicle is engine-driving in second speed and motor torque is input to the first main input shaft 11, i.e., if the sleeve SL2 moves to third speed in-gear position and the dog teeth of the sleeve SL2 mesh with the dog teeth of the third speed drive gear 23, rotation of the first main input shaft 11 is transmitted to the output shaft 14 through the hub HB2, third speed drive gear 23, and second-third speed driven gear 41. As a result, the vehicle is hybrid-driven in second speed by engine torque and by motor torque through the third speed drive gear 23.

In the following, the state of first speed stage being selected by pre-shift as described above, i.e., of driving in second speed with the odd-numbered stage shift mechanism CM1 set in first speed stage, is called "second speed pre-shift first speed driving." And the state of third speed stage being selected by a pre-shift, i.e., of driving in second speed with the odd-numbered stage shift mechanism CM1 set in third speed stage, is called "second speed pre-shift third speed driving." In addition, driving in second speed with the odd-numbered stage shift mechanism CM1 set in neutral (synchronization mechanisms SY1 to SY3 in neutral) is called "second speed pre-shift N driving." Shift modes of the transmission 1 in second speed pre-shift first speed driving, second speed pre-shift third speed driving, and second speed pre-shift N driving are respectively called simply "second speed pre-shift first speed mode," "second speed pre-shift third speed mode," and "second speed pre-shift N mode."

In second speed pre-shift N mode, the first main input shaft 11 is not interposed in the torque transmission path of the travelling drive system and the electric motor 3 is cut off from the travelling drive system. Therefore, when the first clutch C1 engages in the second speed pre-shift N mode, the electric motor 3 is input with engine torque and can generate electric power.

Figure 2:
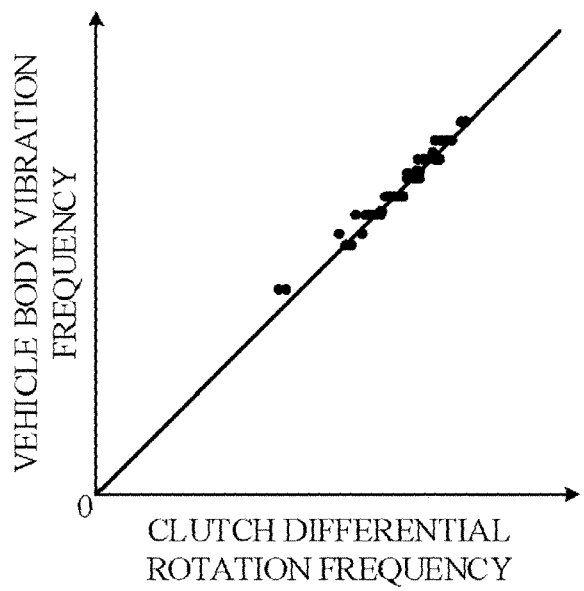
FIG. 2 is a diagram showing a relation between a differential rotation of an input and output shafts of a clutch and a vibration of a vehicle body.

During vehicle drive-off and low-speed driving utilizing the clutches C1 and C2, differential rotation arises between the input shafts (output shaft 2a of engine 2) and the output shafts (first main input shaft 11 and second main input shaft 12) of the clutches C1 and C2. FIG. 2 is a diagram showing relation between differential rotation of clutches C1 and C2 (clutch differential rotation frequency) and vehicle body vibration (vehicle body vibration frequency). As shown in FIG. 2, vibration of a frequency proportional to differential rotation of the clutches C1 and C2 occurs in the vehicle body. More specifically, vehicle body vibration frequency and clutch differential rotation frequency are the same. Vibration of the vehicle body owing to the clutches C1 and C2 as the vibration source therefore becomes a problem.

Figure 3:
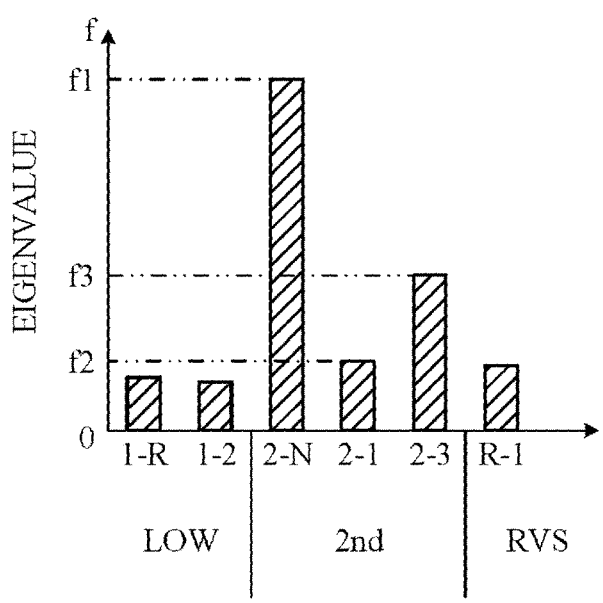
FIG. 3 is a diagram showing an example of an eigenvalue of the travelling drive system.

FIG. 3 is a diagram showing an example of eigenvalue (eigen frequency) f of the travelling drive system. The vehicle can start driving in first speed, second speed or reverse. FIG. 3 shows eigenvalue f in the first speed (Low), second speed ($2^{nd}$) and reverse (Rvs) shift modes in which drive-off is possible. The notations "2-N", "2-1" and "2-3" in the figure indicate second speed pre-shift N mode, second speed pre-shift first speed mode, and second speed pre-shift third speed mode, respectively. The notations "1-R" and "1-2" indicate the shift modes when reverse and second speed are selected by pre-shift in a first speed-established state (namely, first speed pre-shift R mode, and first speed pre-shift second speed mode). The notation "R-1" indicates the shift mode when first speed is selected by pre-shift in a reverse-established state (namely, reverse pre-shift first speed mode).

Figure 4:
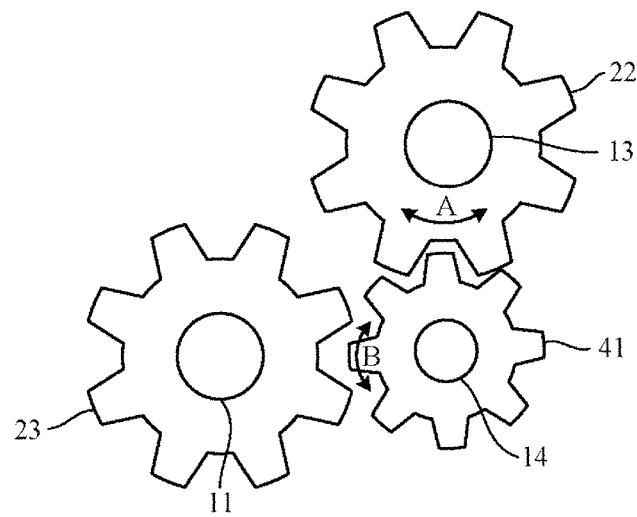
FIG. 4 is a diagram schematically illustrating part of an internal configuration of a transmission of FIG. 1.

As seen in FIG. 3, eigenvalue f1 in second speed pre-shift N mode is considerably greater than the eigenvalues of other shift modes (e.g., eigenvalue f2 in second speed pre-shift first speed mode, and eigenvalue f3 in second speed pre-shift third speed mode). The reason for this is that in second speed pre-shift N mode the first main input shaft 11 is not interposed in the torque transmission path, so that the electric motor 3, which has large inertial moment, is cut off from the travelling drive system. In the so-characterized second speed pre-shift N mode, vibration arises in the vehicle as explained in the following. FIG. 4 is a diagram schematically illustrating part of the internal configuration of the transmission 1.

As shown in FIG. 4, in second speed pre-shift N mode, vibration of the auxiliary input shaft 13 caused by differential rotation of the second clutch C2 (arrow A) transmits to the output shaft 14 through the drive gears (e.g., second speed drive gear 22) and driven gears (e.g., second-third speed driven gear 41). At this time, play (arrow B) arises in the output shaft 14 owing to backlash due to gaps between drive gears around the first main input shaft 11 (e.g., third speed drive gear 23) and driven gears (e.g., second-third speed driven gear 41). Therefore, since the output shaft 14 vibrates at the eigenvalue f1 of the second speed pre-shift N mode, the vehicle body (travelling drive system) is apt to resonate. In order to avoid such a resonance of the vehicle body, the vibration reduction apparatus is configured as follows in the present embodiment.

FIG. 5 is a block diagram showing main components of the vibration reduction apparatus according to the present embodiment. An ECU 50 receives signals from a first rotational speed detector 51 for detecting rotational speed of the output shaft 2a of the engine 2 (engine speed) N1, a second rotational speed detector 52 for detecting rotational speed of the second main input shaft 12 (even-numbered clutch rotational speed) N2, a torque detector 53 for detecting motor torque Tm, a vehicle speed detector 54 for detecting vehicle speed v, and SOC detector 55 for detecting SOC (State Of Charge) of the battery 5.

To the ECU 50 are connected a control valve (e.g., electromagnetic switching valve) 61 for controlling supply of clutch hydraulic pressure from oil pump to the clutches C1 and C2 for engaging and disengaging the clutches C1 and C2, a sleeve movement actuator (e.g., electric motor) 62 for moving the sleeves SL1 to SL6 of the speed synchronization mechanisms SY1 to SY6, and the power drive unit 4 for controlling the electric motor 3 to regulate motor torque Tm. Value of motor torque Tm becomes negative when the electric motor 3 is operated in second speed pre-shift N mode as an electric generator because the electric motor 3 is driven by engine torque in this mode.

The ECU (Electric Control Unit) 50 includes a computer having a processing unit (CPU) 501, a memory unit 502 including ROM, RAM and the like, and other peripheral circuits. Specifically, the ECU 50 includes, inter alia, an engine controller, a transmission controller, an electric motor controller, and a battery controller. In particular, the ECU 50 of the present embodiment includes as functional configurations a first mode switching control unit 50A and a second mode switching control unit 50B. The ECU 50 performs predetermined processing based on input signals from the detectors 51 to 55 and outputs control signals to the control valve 61 (more specifically, solenoid of the control valve 61), actuator 62, and power drive unit 4.

Configuration of the first mode switching control unit 50A will be explained first. When shift mode is second speed pre-shift N mode, the first mode switching control unit 50A determines whether first switching condition is satisfied based on whether a vibration occurrence condition has continued for a predetermined time. When first switching condition is determined to be satisfied, the first mode switching control unit 50A controls the associated control valve 61 and actuator 62 to switch shift mode from second speed pre-shift N mode to second speed pre-shift third speed mode. Moreover, once shift mode is switched to second speed pre-shift third speed mode, it controls the power drive unit 4 to make the electric motor 3 output torque of a predetermined value or greater.

Figure 6:
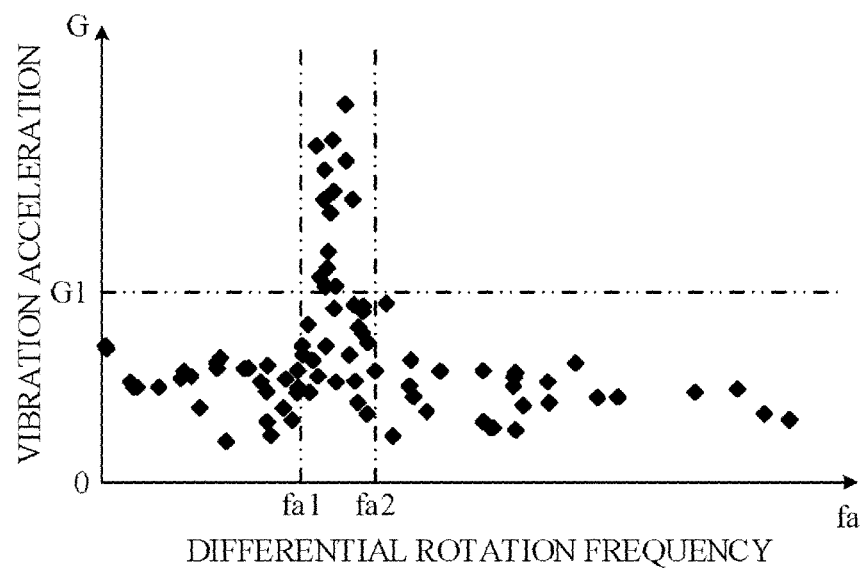
FIG. 6 is a diagram showing a relation between differential rotation of the input and output shafts of a second clutch and the vibration of the vehicle body in second speed pre-shift N mode.

Vibration occurrence condition will be explained next. FIG. 6 is a diagram showing relation between differential rotation of the input and output shafts of the second clutch C2 in second speed pre-shift N mode (differential rotation frequency fa) and vehicle body vibration (vibration acceleration G). This relation is obtained by experiment or simulation. As seen in FIG. 6, in range of differential rotation frequency fa between not less than predetermined value fa1 and not greater than predetermined value fa2, vibration acceleration G exceeds predetermined value G1. Predetermined values fa1 and fa2 correspond to natural value f1 (FIG. 3), and resonance occurs in range of differential rotation frequency fa between not less than predetermined value fa1 and not greater than predetermined value fa2. Predetermined values fa1 and fa2 are stored in memory of the ECU 50 beforehand. Range of differential rotation frequency fa between not less than predetermined value fa1 and not greater than predetermined value fa2 is called "resonance range" hereinafter.

Figure 7:
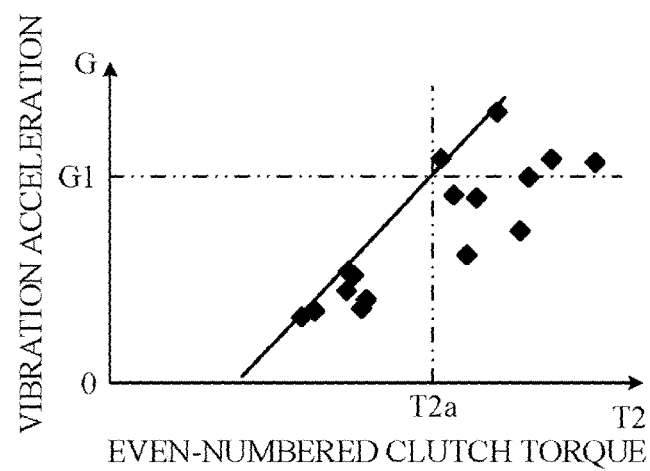
FIG. 7 is a diagram showing a relation between an even-numbered clutch torque acting on the second main input shaft from an engine and the vibration of the vehicle body.

FIG. 7 is a diagram showing relation between torque from the engine 2 acting on the second main input shaft 12 in second speed pre-shift N mode (even-numbered clutch torque T2) and vehicle body vibration (vibration acceleration G). In second speed pre-shift N mode, the electric motor 3 is driven by engine torque Te. Therefore, the even-numbered clutch torque T2 is obtained by adding negative motor torque Tm to engine torque Te. The ECU 50 calculates engine torque Te by a known method. The relation of FIG. 7 is obtained by experiment or simulation. As shown in FIG. 7, vibration acceleration G increases with increasing even-numbered clutch torque T2, and when even-numbered clutch torque T2 reaches or exceeds predetermined value T2a, vibration acceleration G exceeds the aforesaid predetermined value G1. Predetermined value T2a is stored in the memory of the ECU 50 beforehand.

The characteristics of FIG. 7 are determined by the structure of the clutch mechanism C. In the particular structure shown in FIG. 1, in which the clutch disks C1a and C2a are arranged on opposite sides of the plate C3a and the clutch disks C1a and C2a are pushed by hydraulic force against the force of return springs, the characteristics are such that vibration acceleration G increases with increasing even-numbered clutch torque T2.

In light of the foregoing, the first mode switching control unit 50A determines that vibration occurrence condition is satisfied when differential rotation frequency fa is in the resonance range and even-numbered clutch torque T2 becomes predetermined value T2a or greater. As indicated below, vibration acceleration G increases when vibration occurrence condition continues for a predetermined time or longer.

Figure 8:
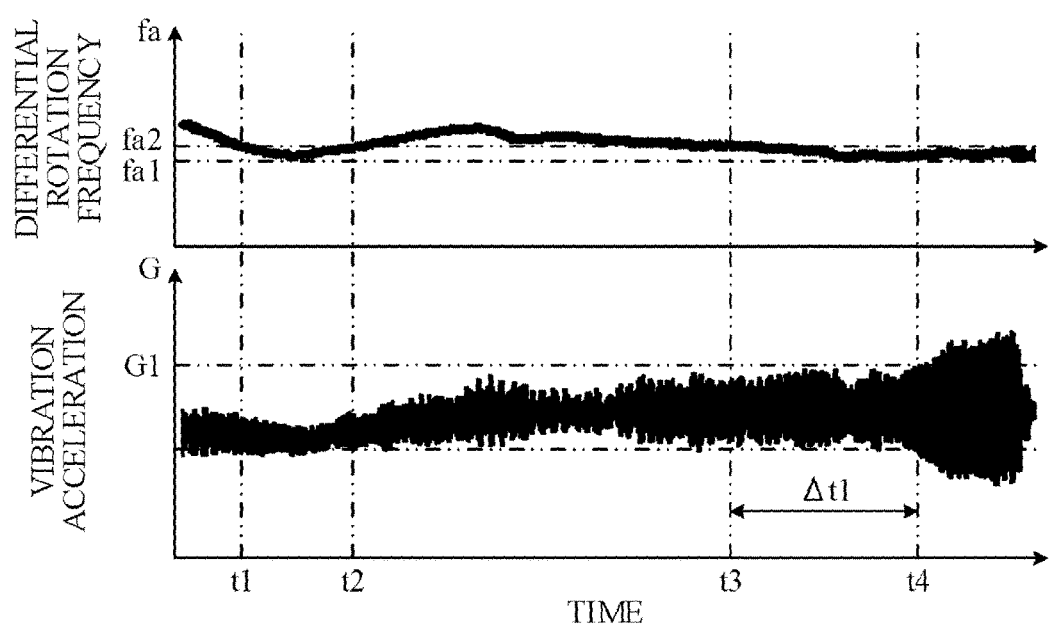
FIG. 8 is a time chart showing relation between a differential rotation frequency of the clutch and a vibration acceleration of the vehicle body.

FIG. 8 is a time chart showing relation between differential rotation frequency fa of the second clutch C2 and vibration acceleration G of the vehicle body when even-numbered clutch torque T2 is equal to or greater than predetermined value T2a. This relation is obtained by experiment or simulation. As shown in FIG. 8, between time t1 and time t2, differential rotation frequency fa is present in resonance range of not less than predetermined value fa1 and not greater than predetermined value fa2, indicating that vibration occurrence condition is satisfied. However, owing to the short duration of vibration occurrence condition in this case, vibration acceleration G does not become large and remains below predetermined value G1.

On the other hand, once differential rotation frequency fa is included in the resonance range and vibration occurrence condition is satisfied at time t3, vibration acceleration G reaches or exceeds predetermined value G1 at time t4 at which the vibration occurrence condition has continued for the predetermined time period Δt1. In light of the foregoing, the first mode switching control unit 50A determines that first switching condition has been satisfied by vibration occurrence condition continuing for at least predetermined time period Δt1. Predetermined time period Δt1 here is stored in memory of the ECU 50 beforehand.

Figure 9:
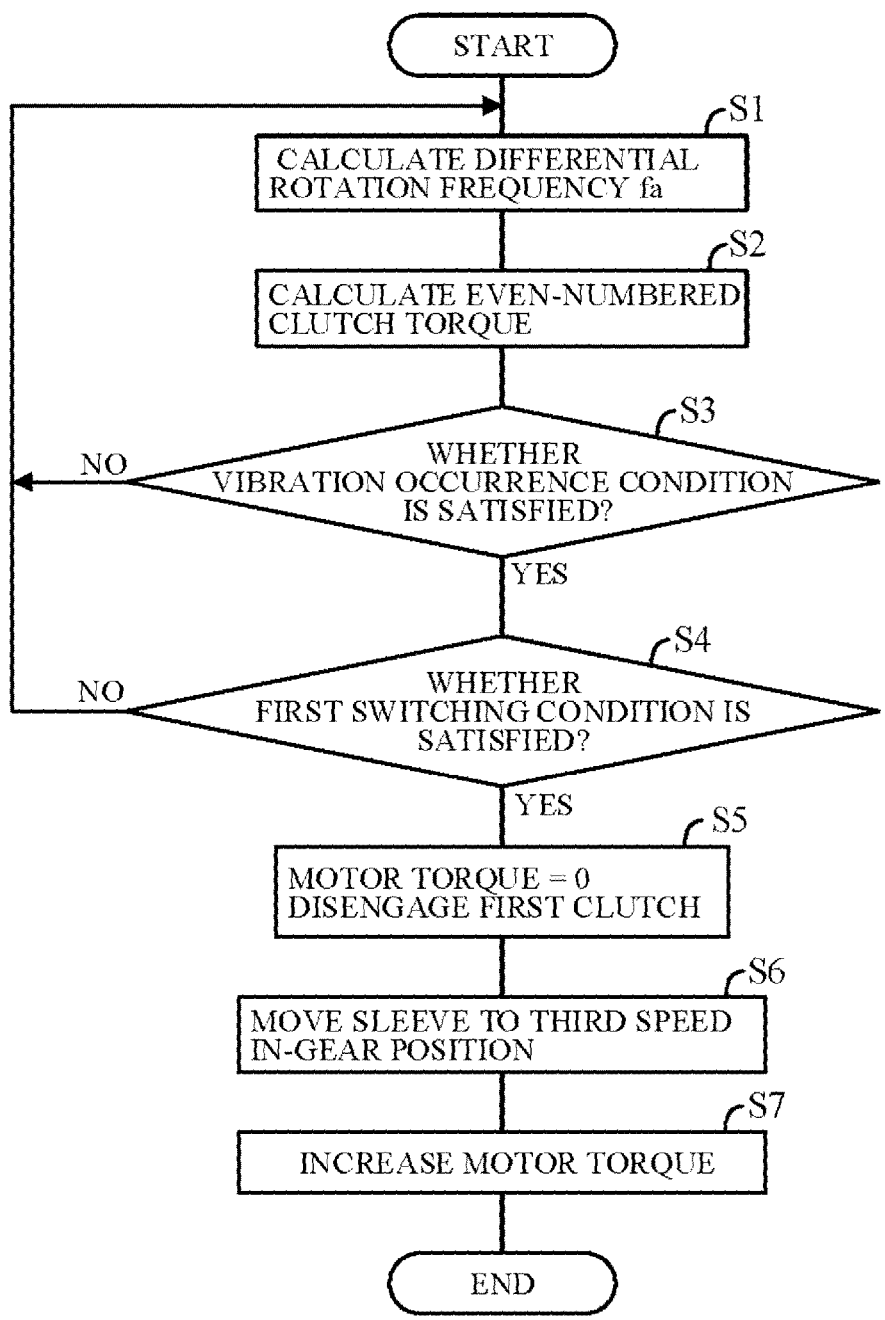
FIG. 9 is a flowchart showing an example of processing performed in a first mode switching control unit of FIG. 5.

FIG. 9 is a flowchart showing an example of processing performed by the CPU (the first mode switching control unit 50A). The processing indicated by this flowchart is started when second speed stage is established and shift mode is second speed pre-shift N mode with the first clutch C1 engaged to enable the electric motor 3 to generate electricity.

First, in S1 (S: processing Step), the first mode switching control unit 50A calculates differential rotation frequency fa of the second clutch C2 by subtracting even-numbered clutch rotational speed N2 detected by the second rotational speed detector 52 from engine speed N1 detected by the first rotational speed detector 51. Next, in S2, it calculates even-numbered clutch torque T2 by adding motor torque Tm detected by the torque detector 53 (in this case, negative motor torque Tm) to engine torque Te.

Next, in S3, it is determined whether calculated differential rotation frequency fa of the second clutch C2 is in pre-stored resonance range fa (fa1≤fa≤fa2) and calculated even-numbered clutch torque T2 is equal to or greater than predetermined value T2a, i.e., whether vibration occurrence condition is satisfied. When the result in S3 is YES, the program goes to S4, and when NO, returns to S1. In S4, it is determined whether vibration occurrence condition has continued for or longer than pre-stored predetermined time period Δt1, i.e., whether first switching condition is satisfied. When the result in S4 is YES, the program goes to S5, and when NO, returns to S1.

In S5, a control signal is output to the power drive unit 4 to make motor torque Tm zero and a control signal is output to the associated control valve 61 to disengage the first clutch C1. Next, in S6, a control signal is output to the associated actuator 62 to move the sleeve SL2 to third speed in-gear position. Namely, the odd-numbered stage shift mechanism CM1 is put in third speed stage by a pre-shift. Next, in S7, a control signal is output to the power drive unit 4 to increase motor torque Tm to a positive predetermined value. The electric motor 3 therefore produces assist torque. Travelling drive torque Td is kept constant at this time by reducing engine torque Te by the amount of assist torque.

Figure 10:
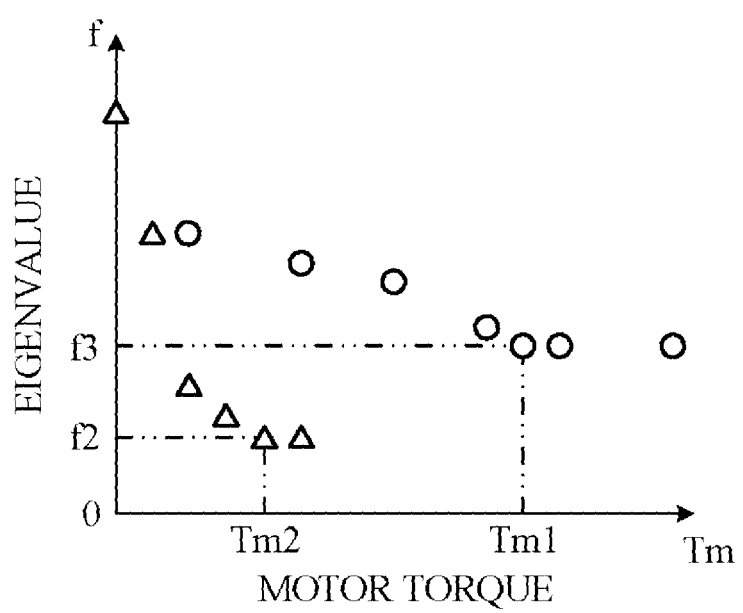
FIG. 10 is a diagram showing a relation between motor torque and eigenvalue of the travelling drive system.

FIG. 10 is a diagram showing relation between motor torque Tm and eigenvalue f of the travelling drive system. This relation is obtained by simulation, for example. The circles and triangles indicate eigenvalues f in second speed pre-shift third speed mode and second speed pre-shift first speed mode, respectively. As seen in FIG. 10, eigenvalue f in second speed pre-shift third speed mode decreases with increasing motor torque Tm to become predetermined value f3 (FIG. 3) at motor torque Tm of predetermined value Tm1 and greater. Similarly, eigenvalue f in second speed pre-shift first speed mode also decreases with increasing motor torque Tm to become predetermined value f2 (FIG. 3) at motor torque Tm of predetermined value Tm2 and greater.

So in S7, motor torque Tm is increased by, for example, predetermined value Tm1 or greater (e.g., by predetermined value Tm1). This makes it possible to reduce eigenvalue f of the travelling drive system and avoid resonance of the vehicle body. Although in the present embodiment shift mode is switched to second speed pre-shift third speed mode upon satisfaction of first switching condition, switching to second speed pre-shift first speed mode is also possible, and in such case it suffices to increase motor torque Tm by predetermined value Tm2 or greater (e.g., by predetermined value Tm2). However, when the vehicle starts driving in second speed pre-shift N mode, the next operation is usually to shift up to third speed, and in view of this point, pre-shift to third speed by switching from second speed pre-shift N mode to second speed pre-shift third speed mode as in the present embodiment is preferable.

Figure 11:
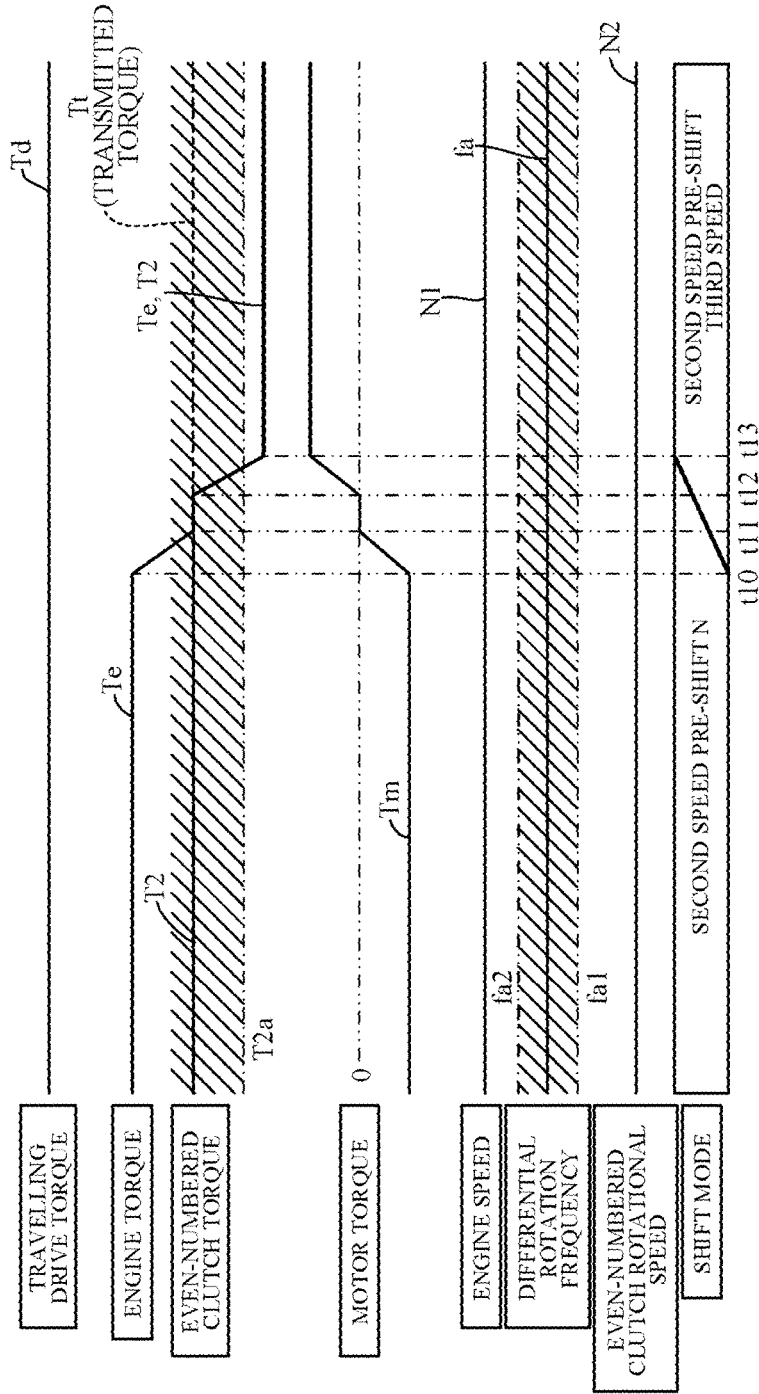
FIG. 11 is a timing chart showing an example of an operation of the travelling drive system by the vibration reduction apparatus according to the embodiment of the present invention.

FIG. 11 is a timing chart showing an example of a travelling drive system operation by the vibration reduction apparatus according to an embodiment of the present invention. FIG. 11 shows an extracted period of operation from before to after mode switching from second speed pre-shift N mode to second speed pre-shift third speed mode. Tt (broken line) in the drawing is even-numbered clutch torque required to keep travelling drive torque Td constant when shifting back to second speed pre-shift N mode after shifting from second speed pre-shift N mode to second speed pre-shift third speed mode, i.e., desired even-numbered clutch torque for keeping travelling drive torque Td constant from before to after mode switching, and is called "transmitted torque."

Transmitted torque Tt in second speed pre-shift N mode is obtained by adding negative motor torque Tm to engine torque Te and is equal to even-numbered clutch torque T2. On the other hand, transmitted torque Tt in second speed pre-shift third speed mode is obtained by adding positive motor torque Tm to engine torque Te, strictly speaking by adding to positive motor torque Tm the value obtained by multiplying gear ratios of the odd-numbered and even-numbered stages. As shown in FIG. 11, when travelling drive torque Td in response to accelerator pedal depression is constant, transmitted torque Tt is also constant. Transmitted torque Tt is calculated by the ECU 50.

In the present embodiment, the ECU 50 (the first mode switching control unit 50A and second mode switching control unit 50B) implements control of relevant apparatus components to control engine torque Te and motor torque Tm so as to keep travelling drive torque Td (transmitted torque Tt) constant from before to after mode switching. For example, it controls engine torque Te by outputting a control signal to a throttle valve (not shown) and controls motor torque Tm by outputting a control signal to the power drive unit 4. Therefore, if motor torque Tm (assist torque) increases, engine torque Te reduces by the same amount.

When first switching condition is satisfied at time t10 of FIG. 11 owing to presence of differential rotation frequency fa of the second clutch C2 in resonance range (fa1≤fa≤fa2), indicated by hatching, and to state of even-numbered clutch torque T2 (equal to transmitted torque Tt) remaining equal to or greater than predetermined value T2a, indicated by hatching, for predetermined time period Δt1, motor torque Tm becomes zero at time t11 and the first clutch C1 is disengaged (S5). As a result, engine torque Te decreases, and engine torque Te and even-numbered clutch torque T2 become equal at time t11.

After this, up to time t12, the odd-numbered stage shift mechanism CM1 is pre-shifted to third speed (S6). Moreover, motor torque Tm is increased by a predetermined value (e.g., predetermined value Tm1 of FIG. 10) between time t12 and time t13 (S7). As a result, shift mode switches from second speed pre-shift N mode to second speed pre-shift third speed mode, whereby assist torque of the electric motor 3 is added to the travelling drive system. As a result, eigenvalue f decreases (FIG. 3), and resonance of the vehicle body can be avoided. At this time, travelling drive torque Td remains constant from before to after mode switching, and engine torque Te and even-numbered clutch torque T2 decrease by the amount of the assist torque.

Figure 12:
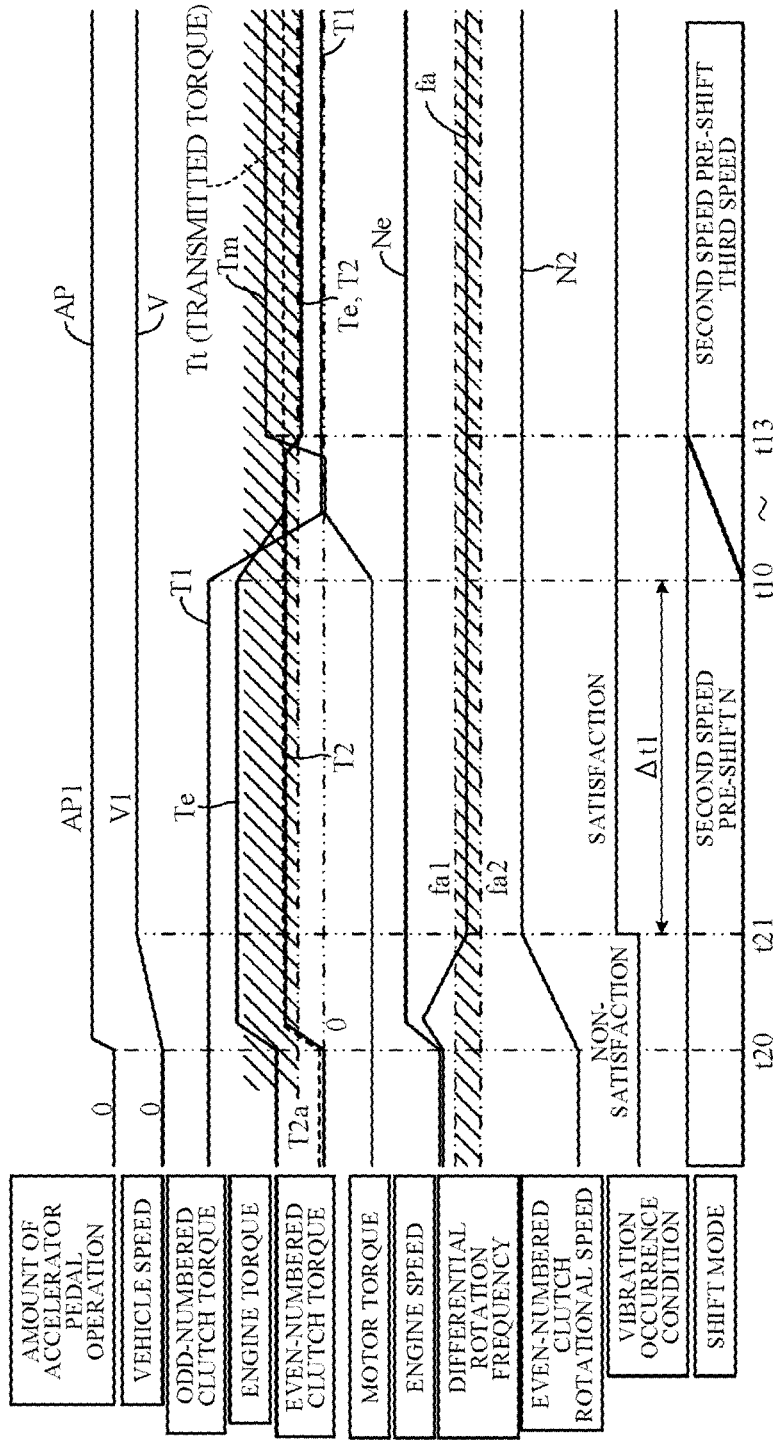
FIG. 12 is a timing chart showing an example of an operation of the travelling drive system by the vibration reduction apparatus according to the embodiment of the present invention, in particular, an example of longer term operation than that of the example of FIG. 11.

FIG. 12 is a timing chart showing an example of travelling drive system operation by the vibration reduction apparatus according to an embodiment of the present invention, namely, an example of longer term operation than that of the example of FIG. 11. Operations at times t10 to t13 of FIG. 12 are the same as those at the same times of FIG. 11. Odd-numbered clutch torque T1 of FIG. 12 is torque from the engine 2 acting on the first main input shaft 11. In second speed pre-shift N mode, since drives the electric motor 3 is driven by engine torque Te, positive odd-numbered clutch torque T1 is generated. The timing chart of FIG. 12 applies during low-speed vehicle driving, and when the accelerator pedal is operated at time t20 (amount of accelerator pedal operation AP1), engine torque Te and even-numbered clutch torque T2 increase, whereby even-numbered clutch torque T2 comes to reach or exceed predetermined value T2$a$. Then, vehicle speed v rises to v1 by time t21, whereupon the vehicle starts low-speed driving.

At this time, engine speed Ne rises at time t20 and even-numbered clutch rotational speed N2 rises more slowly than engine speed Ne. As a result, at time t21 differential rotation frequency fa enters resonance range between not less than predetermined value fa1 and not greater than predetermined value fa2, thereby satisfying vibration occurrence condition. Then, when slow-speed driving is maintained, even-numbered clutch torque T2 reaches or exceeds predetermined value T2$a$ and differential rotation frequency fa remains in a state within resonant frequency range for predetermined time period Δt1, first switching condition is satisfied at time t10. As a result, shift mode switches from second speed pre-shift N mode to second speed pre-shift third speed mode, whereby resonance of the vehicle body can be avoided.

The second mode switching control unit 50B of FIG. 5 is explained next. After shift mode has switched from second speed pre-shift N mode to second speed pre-shift third speed mode, the second mode switching control unit 50B determines whether second switching condition is satisfied, and when it is satisfied, the second mode switching control unit 50B controls the associated control valve 61 and actuator 62 so as to return shift mode from second speed pre-shift third speed mode to second speed pre-shift N mode. In addition, once shift mode is switched to second speed pre-shift N mode, it controls power drive unit 4 to cause the electric motor 3 to generate electricity.

Second switching condition is a condition to be satisfied for returning shift mode to second speed pre-shift N mode and includes first mode return condition, second mode return condition and third mode return condition. The second mode switching control unit 50B returns shift mode to second speed pre-shift N mode when any one of these three conditions is satisfied.

Turning first to an explanation of first mode return condition, this condition is satisfied when first vibration avoidance condition continues for predetermined time period Δt2. First vibration avoidance condition adopts vehicle speed v just after mode switching from second speed pre-shift N mode to second speed pre-shift third speed mode (vehicle speed v1 at time t13 of FIG. 12) as a reference speed and is satisfied when vehicle speed v rises above this reference vehicle speed v1 by predetermined value Δv1 or greater. In other words, when vehicle speed v is faster than vehicle speed just after mode switching by predetermined value Δv1 or greater, even-numbered clutch rotational speed N2 rises, so that differential rotation frequency fa can be assumed to be outside resonance range. Therefore, even if shift mode is returned to second speed pre-shift N mode, vibration occurrence condition is not satisfied and resonance of the vehicle body can be avoided in second speed pre-shift N mode.

Figure 13A:
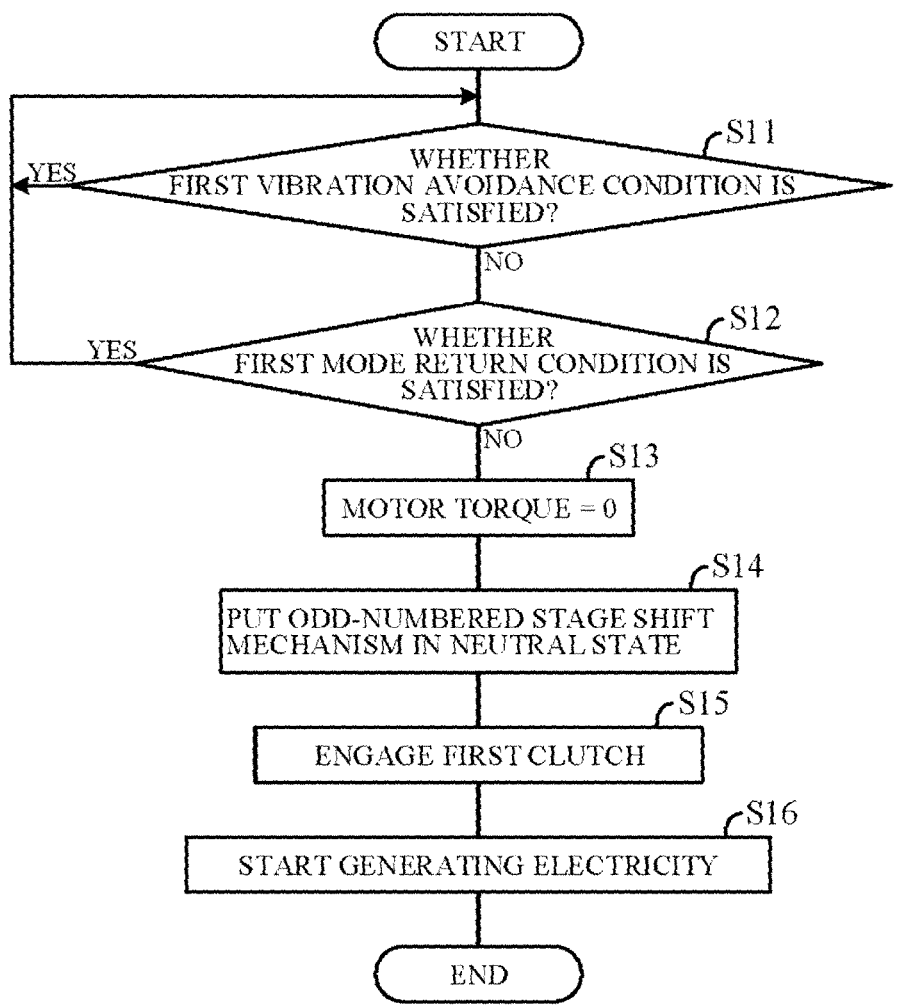
FIG. 13A is a flowchart showing an example of processing performed in a second mode switching control unit of FIG. 5, in particular, an example of processing in relation to a first mode return condition.

FIG. 13A is a flowchart showing an example of processing performed by the CPU (the second mode switching control unit 50B), specifically an example of processing in a case where second switching condition is adopted as first mode return condition. The processing indicated by this flowchart is started, for example, when first switching condition is satisfied and shift mode is switched from second speed pre-shift N mode to second speed pre-shift third speed mode.

As shown in FIG. 13A, first, in S11, the second mode switching control unit 50B determines based on a signal from the vehicle speed detector 54 whether vehicle speed v has risen above reference vehicle speed v1 by predetermined value Δv1 or greater, i.e., whether first vibration avoidance condition is satisfied. S11 is repeated until the result becomes YES, and upon the result in S11 becoming YES, the program goes to S12. In S12, whether first vibration avoidance condition has continued for at least predetermined time period Δt2 stored in memory beforehand is determined, namely, it is determined whether first mode return condition is satisfied. When the result in S12 is YES, the program advances to S13, and when NO, returns to S11.

In S13, a control signal is output to the power drive unit 4 to make motor torque Tm zero. Next, in S14, a control signal is output to the associated actuator 62 to move the sleeve SL2 to neutral position and put the odd-numbered stage shift mechanism CM1 in neutral state. Next, in S15, a control signal is output to the control valve 61 to engage the first clutch C1. Then in S16, a control signal is output to the power drive unit 4 to drive the electric motor 3 by using engine torque Te to start generating electricity. Shift mode therefore switches to second speed pre-shift N mode.

Figure 13B:
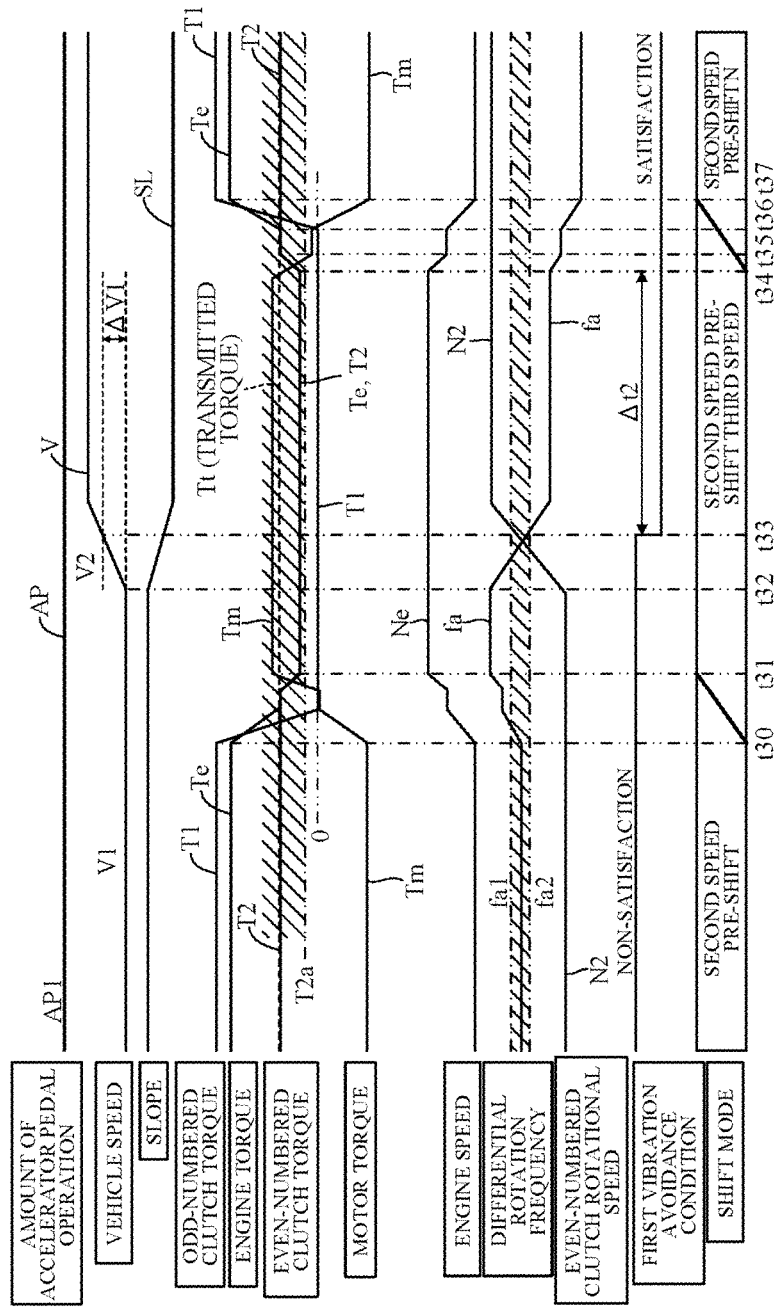
FIG. 13B is a timing chart showing a modification of FIG. 12, in particular, an example of an operation before and after satisfaction of the first mode return condition.

FIG. 13B is a timing chart showing a modification on FIG. 12, particularly an example of operation before and after satisfaction of first mode return condition. In FIG. 13B, operation begins in a state of uphill driving at low speed v1 on a gentle upward slope, with amount of accelerator pedal operation AP kept constant. FIG. 13B covers switching operation from second speed pre-shift N mode to second speed pre-shift third speed mode and further to second speed pre-shift N mode.

As shown in FIG. 13B, once first switching condition is satisfied between time t30 and time t31, shift mode switches from second speed pre-shift N mode to second speed pre-shift third speed mode, similarly to in FIG. 12 between time t10 and time t13. However at this time, differently from in FIG. 12, engine speed Ne changes owing to fluctuating load on the engine 2, with the result that differential rotation frequency fa also changes. Therefore, differential rotation frequency fa departs from resonance range, indicated by hatching, resulting in non-satisfaction of vibration occurrence condition. However, despite the non-satisfaction of vibration occurrence condition, first vibration avoidance condition is still not satisfied, so switching to second speed pre-shift N mode is not performed at this time.

When the uphill slope moderates at time t32, vehicle speed v rises from the reference vehicle speed v1 at time of mode switching. At this point, even-numbered clutch rotational speed N2 increases and differential rotation frequency fa decreases. When vehicle speed v rises to vehicle speed v2 at time t33, vehicle speed change amount reaches predetermined value Δv1, thereby satisfying first vibration avoidance condition (S11). At time t34, when first vibration avoidance condition has continued for predetermined time period Δt2, first mode return condition is satisfied (S12). As a result, motor torque Tm becomes zero at time t35 (S13), and engine torque Te and even-numbered clutch torque T2 increase.

At time t36, odd-numbered stage shift mechanism CM1 assumes neutral state (S14), and first clutch C1 engages (S15). As a result, motor torque Tm becomes negative, the electric motor 3 starts to generate electricity (S16), engine torque Te and odd-numbered clutch torque T1 increase, and transmitted torque Tt (travelling drive torque) becomes constant between before and after mode switching. At time t37, mode switching from second speed pre-shift third speed mode to second speed pre-shift N mode is completed. At this point, differential rotation frequency fa is outside resonance range, so that vibration occurrence condition is not satisfied and the vehicle can drive stably in second speed pre-shift N mode.

Second mode return condition is explained next. Second mode return condition is satisfied when second vibration avoidance condition continues for predetermined time period $\Delta t3$. Second vibration avoidance condition is satisfied when transmitted torque Tt falls below predetermined value T2a. This is because when transmitted torque Tt falls below predetermined value T2a in second speed pre-shift third speed mode, even-numbered clutch torque T2 also comes to fall below predetermined value T2a upon return to second speed pre-shift N mode with travelling drive torque Td kept constant. Therefore, vibration occurrence condition is not satisfied even on return to second speed pre-shift N mode, so that resonance of the vehicle body can be avoided in second speed pre-shift N mode.

Figure 14A:
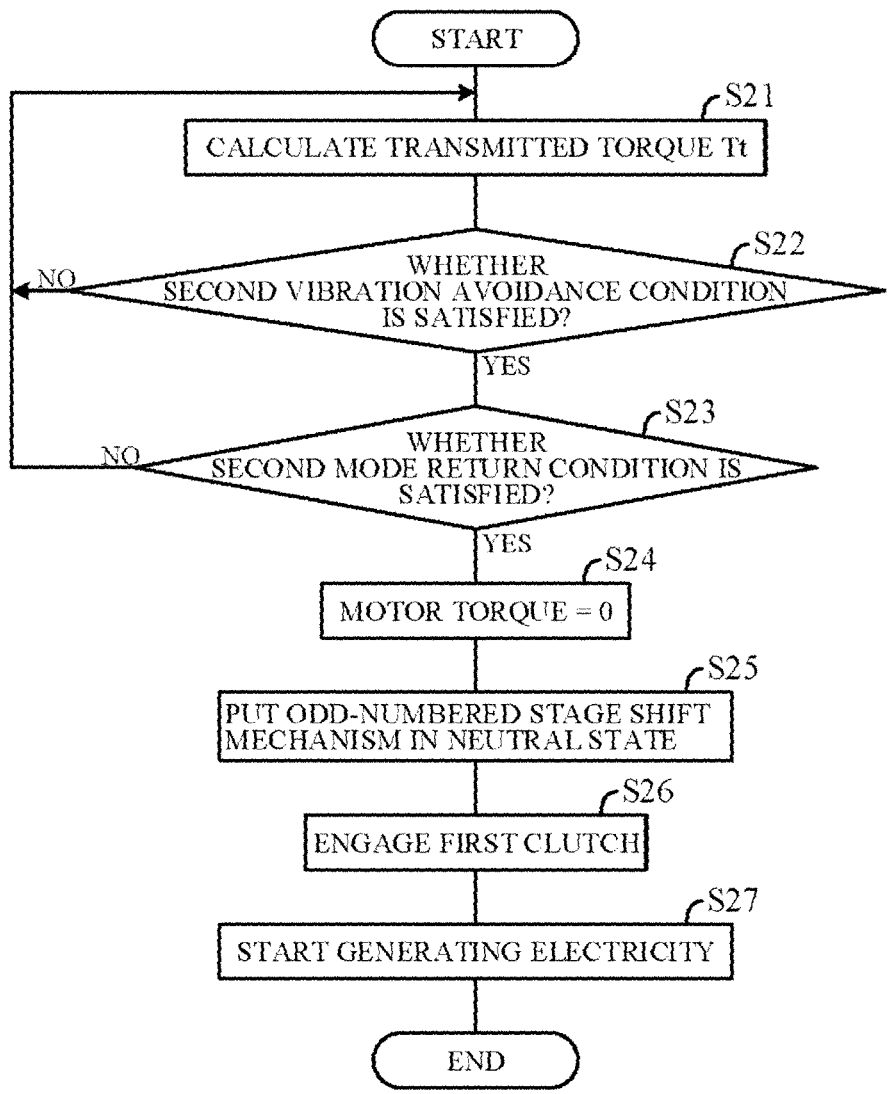
FIG. 14A is a flowchart showing an example of processing performed in a second mode switching control unit of FIG. 5, in particular, an example of processing in relation to a second mode return condition.

FIG. 14A is an example of processing performed in the CPU (second mode switching control unit 50B), specifically a flowchart showing an example of processing in a case where second mode return condition is adopted as second switching condition. The processing indicated by this flowchart is started, for example, when first switching condition is satisfied and shift mode is switched from second speed pre-shift N mode to second speed pre-shift third speed mode.

As shown in FIG. 14A, first, in S21, the second mode switching control unit 50B uses engine torque Te and motor torque Tm detected by the torque detector 53 to calculate transmitted torque Tt. Next, in S22, the second mode switching control unit 50B determines whether transmitted torque Tt is less than predetermined value T2a, namely, whether second vibration avoidance condition is satisfied. When the result in S22 is YES, the program goes to S23, and when NO, returns to S21. In S23, whether second vibration avoidance condition has continued for at least predetermined time period $\Delta t3$ stored in memory beforehand is determined, namely, whether second mode return condition is satisfied is determined. When the result in S23 is YES, the program advances to S24, and when NO, returns to S21.

Thereafter, similarly to the processing when first mode return condition is satisfied (S13 to S16), the odd-numbered stage shift mechanism CM1 is put in neutral state and first clutch C1 is engaged to drive the electric motor 3 by using engine torque Te to start generating electricity (S24 to S27).

Figure 14B:
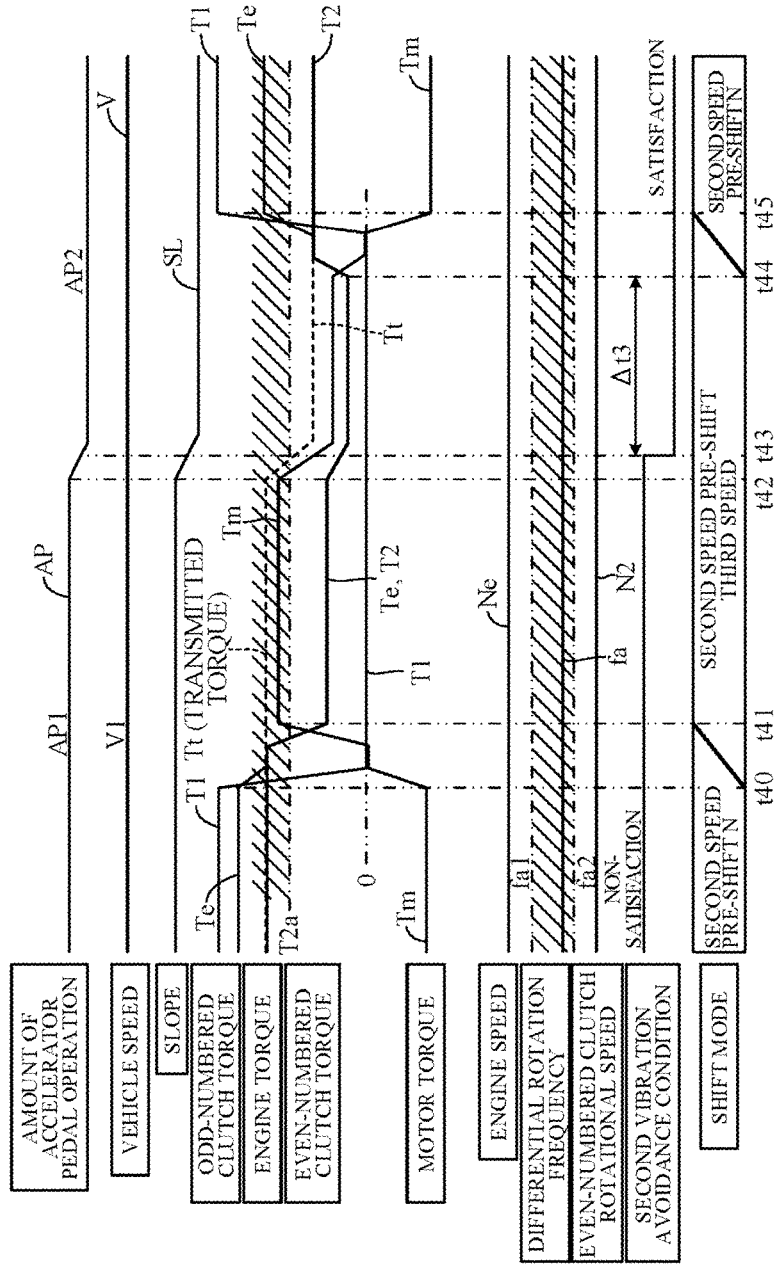
FIG. 14B is a timing chart showing a modification of FIG. 12, in particular, an example of an operation before and after satisfaction of the second mode return condition.

FIG. 14B is a timing chart showing a modification on FIG. 12, particularly an example of operation before and after satisfaction of second mode return condition. In FIG. 14B, operation begins in a state of uphill driving at a constant low speed on a gentle upward slope. FIG. 14B covers switching operation from second speed pre-shift N mode to second speed pre-shift third speed mode and further to second speed pre-shift N mode.

As shown in FIG. 14B, once first switching condition is satisfied between time t40 and time t41, shift mode switches from second speed pre-shift N mode to second speed pre-shift third speed mode, similarly to in FIG. 12 between time t10 and time t13. When the uphill slope moderates at time t42 and depression of the accelerator pedal decreases, motor torque Tm, engine torque Te and even-numbered clutch torque T2 decrease, so that transmitted torque Tt decreases. Thereafter, when transmitted torque Tt falls below predetermined value T2a at time t43, second vibration avoidance condition is satisfied (S22).

At time t44, when second vibration avoidance condition has continued for predetermined time period $\Delta t3$, second mode return condition is satisfied (S23). As a result, similarly to when first mode return condition is satisfied (time t34 to time t37 of FIG. 13B), shift mode switches from second speed pre-shift third speed mode to second speed pre-shift N mode. When mode switching is completed at time t45, even-numbered clutch torque T2 is equal to transmitted torque Tt and less than predetermined value T2a. As a result, vibration occurrence condition is not satisfied and the vehicle can drive stably in second speed pre-shift N mode.

Figure 15A:
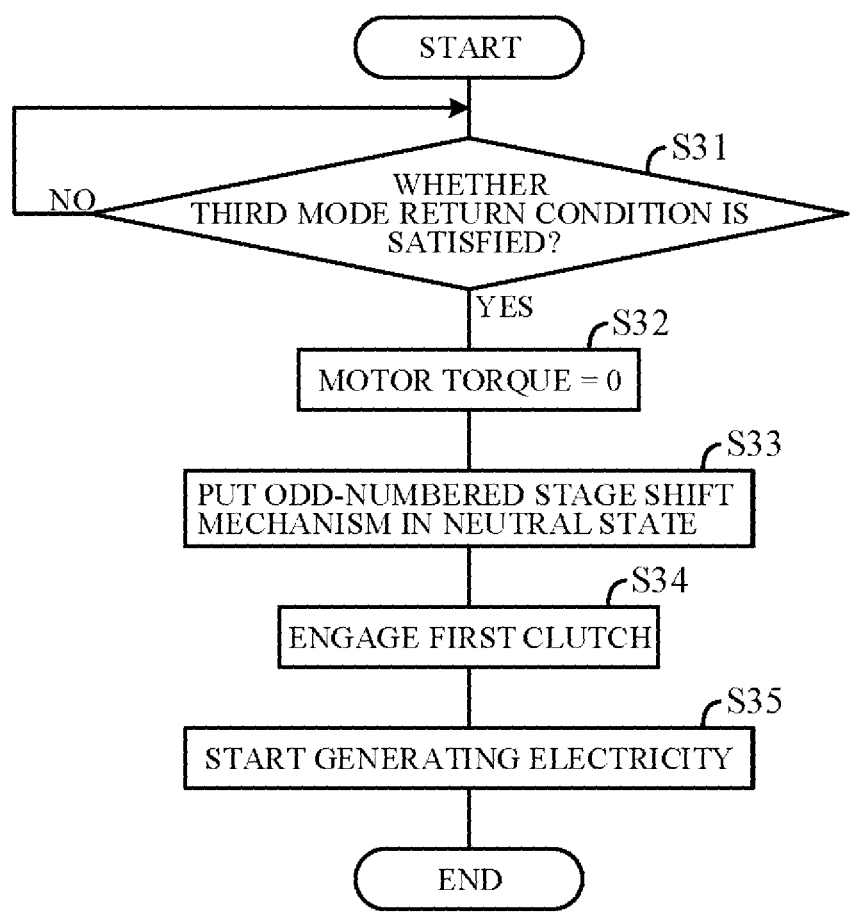
FIG. 15A is a flowchart showing an example of processing performed in a second mode switching control unit of FIG. 5, in particular, an example of processing in relation to a third mode return condition.

Third mode return condition is explained next. Third mode return condition is satisfied when state of charge SOC of the battery 5 falls to or below predetermined value SOC1. FIG. 15A is an example of processing performed in the CPU (second mode switching control unit 50B), specifically a flowchart showing an example of processing in a case where third mode return condition is adopted as second switching condition. The processing indicated by this flowchart is started, for example, when first switching condition is satisfied and shift mode is switched from second speed pre-shift N mode to second speed pre-shift third speed mode.

As shown in FIG. 15A, first, in S31, the second mode switching control unit 50B determines in second speed pre-shift third speed mode whether state of charge SOC of the battery 5 (amount of charge remaining in the battery 5) detected by the SOC detector 55 is at or below predetermined value SOC1, namely, whether third mode return condition is satisfied. S31 is repeated until the result becomes YES, and upon the result in S31 becoming YES, the program goes to S32. Thereafter, similarly to the processing when first mode return condition and second mode return condition are satisfied (S13 to S16; S24 to S27), the odd-numbered stage shift mechanism CM1 is put in neutral state and first clutch C1 is engaged to drive the electric motor 3 by using engine torque Te to start generating electricity (S32 to S35).

Figure 15B:
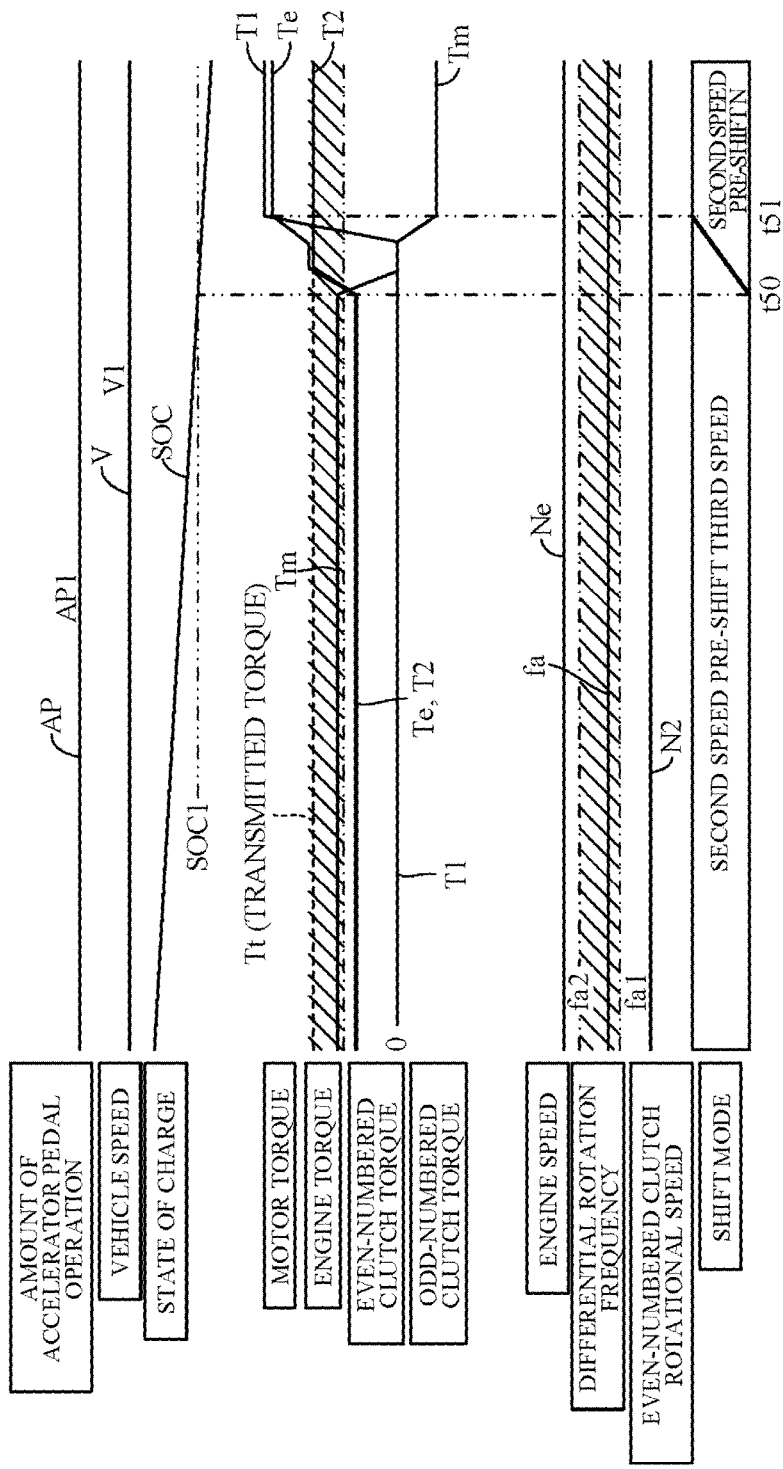
FIG. 15B is a timing chart showing a modification of FIG. 12, in particular, an example of an operation before and after satisfaction of the third mode return condition.

FIG. 15B is a timing chart showing a modification on FIG. 12, particularly an example of operation in the travelling drive system before and after satisfaction of third mode return condition. At time t50 of FIG. 15B, neither first mode return condition nor second mode return condition is satisfied in second speed pre-shift third speed mode. At this time, the second mode switching control unit 50B determines whether battery state of charge SOC is at or below predetermined value SOC1, and when battery state of charge SOC is determined to be at or below predetermined value SOC1, similarly to when first mode return condition and second mode return condition are satisfied, shift mode is switched from second speed pre-shift third speed mode to second speed pre-shift N mode. The electric motor 3 therefore generates electricity that is used to charge the battery 5.

When mode switching is completed at time t51, differential rotation frequency fa is in resonance range and even-numbered clutch torque T2 is predetermined value T2a or greater. Vibration occurrence condition is therefore satisfied and shift mode is apt to switch to second speed pre-shift third speed mode again. So when battery state of charge SOC is at or below predetermined value SOC1, the first mode switching control unit 50A prohibits mode switching from second speed pre-shift N mode to second speed pre-shift third speed mode irrespective of whether or not vibration occurrence condition is satisfied.

Specifically, the first mode switching control unit 50A determines whether battery state of charge SOC detected by the SOC detector 55 is at or below predetermined value SOC1. Then when the battery state of charge SOC is determined to be at or below predetermined value SOC1, it prohibits the processing of FIG. 9 (vibration reduction processing). This gives charging of the battery 5 priority over reduction of vehicle vibration.

Figure 16:
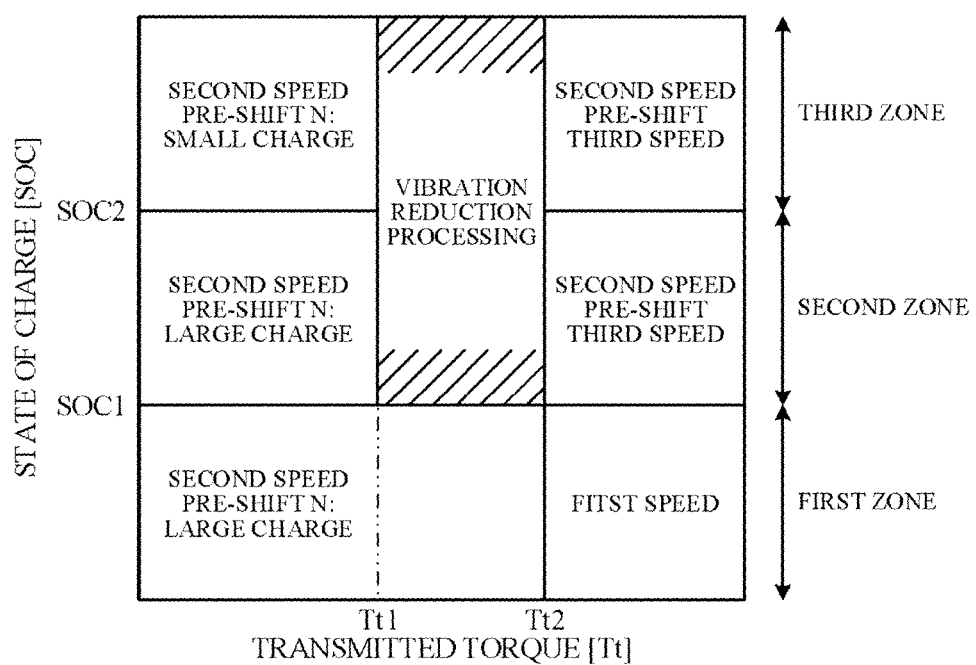
FIG. 16 is a diagram showing a relation between a transmitted torque and a state of charge of a battery by the vibration reduction apparatus according to the embodiment of the present invention and a diagram showing a zone in which a processing for the vibration reduction is performed.

FIG. 16 is a schematic representation divided into multiple zones of relation between transmitted torque Tt and battery state of charge SOC. FIG. 16 is broadly divided into battery state of charge SOC first zone of not greater than predetermined value SOC1, second zone of greater than predetermined value SOC1 and not greater than predetermined value SOC2, and third zone greater than predetermined value SOC2. In second zone and third zone, the aforesaid vibration reduction processing is performed to enable shift mode switching from second speed pre-shift N mode to second speed pre-shift third speed mode when transmitted torque Tt is not less than predetermined value Tt1 and not greater than predetermined value Tt2, for example. In a case where state of charge SOC is greater than predetermined value SOC2, need for battery charging is minimal and motor driving by motor torque Tm using power from the battery 5 is possible.

In first zone, vibration reduction processing is prohibited and the vehicle drives in second speed pre-shift N mode even if transmitted torque Tt becomes predetermined value Tt1 or greater. Since this enables driving of the electric motor 3 with engine torque Te, insufficient charging of the battery 5 can be prevented. Moreover, when transmitted torque Tt becomes predetermined value Tt2 or greater, driving force is prioritized by switching shift mode to first speed mode (e.g., first speed pre-shift second speed mode), whereby the vehicle drives using engine torque Te. As a result, driving force is ensured even without assist torque from the electric motor 3, so that charge depletion of the battery 5 can be prevented. When battery state of charge SOC is predetermined value SOC2 or less, the vehicle drives using engine torque Te.

This embodiment of the present invention can achieve advantages and effects such as the following:

(1) The hybrid vehicle vibration reduction apparatus according to the present embodiment includes the engine 2; the odd-numbered stage shift mechanism CM1 which includes the first main input shaft 11 and the multiple odd-numbered stage gears 21, 23, 25 and 27 to output rotation of the first main input shaft 11 to the output shaft 14 through one of the gears 21, 23, 25 and 27 so as to shift gear-ratio; the even-numbered stage shift mechanism CM2 which includes the second main input shaft 12 and the multiple even-numbered stage gears 22, 24 and 26 to output rotation of the second main input shaft 12 to the output shaft 14 through one of the gears 22, 24 and 26 so as to shift speed-ratio; the first clutch C1 which connects or disconnects the output shaft 2a of the engine 2 and the first main input shaft 11 to transmit or non-transmit engine torque Te to the first main input shaft 11; the second clutch C2 which connects or disconnects the output shaft 2a of the engine 2 and the second main input shaft 12 to transmit or non-transmit engine torque Te to the second main input shaft 12; the motor 3 connected to the first main input shaft 11 and capable of generating electricity; the control valve 61 and actuator 62 which drive the odd-numbered stage shift mechanism CM1, even-numbered stage shift mechanism CM2, first clutch C1 and second clutch C2; the ECU 50 which controls the control valve 61 and actuator 62 and which controls the electric motor 3 through the power drive unit 4, so that, in second speed pre-shift N mode, engine torque Te is output to the electric motor 3 through the first main input shaft 11 and is output to the output shaft 14 through the even-numbered stage shift mechanism CM2, and in second speed pre-shift third speed mode, engine torque Te is output to the output shaft 14 through the even-numbered stage shift mechanism CM2 and motor torque Tm is output to the output shaft 14 through the odd-numbered stage shift mechanism CM1; and the first rotational speed detector 51, second rotational speed detector 52 and ECU 50 (S1) which detects the difference between the rotational speed of the output shaft 2a of the engine 2 and the rotational speed of the second main input shaft 12 (differential rotation frequency fa) (FIGS. 1, 5 and 9). When differential rotation frequency fa detected in second speed pre-shift N mode based on detection values of the first rotational speed detector 51 and second rotational speed detector 52 is within resonance range between not less than predetermined value fa1 and not greater than predetermined value fa2 continuously for predetermined time period Δt1, the ECU 50 (first mode switching control unit 50A) controls the associated control the valve 61 and actuator 62, and the power drive unit 4, so as to switch from second speed pre-shift N mode to second speed pre-shift third speed mode (S3 to S7).

By thus adopting a configuration that responds to detection of differential rotation frequency fa likely to cause resonance of the vehicle body by switching from second speed pre-shift N mode to second speed pre-shift third speed mode and transmitting motor torque Tm through the first main input shaft 11 to the output shaft 14, eigenvalue f of the travelling drive system (FIG. 3) is lowered and resonance of the vehicle body can be prevented.

(2) The hybrid vehicle vibration reduction apparatus further includes the torque detector 53 and ECU 50 (S2) that detect even-numbered clutch torque T2 acting on the second main input shaft 12 (FIGS. 5 and 9). In second speed pre-shift N mode, when differential rotation frequency fa detected based on detected values of the first rotational speed detector 51 and second rotational speed detector 52 is in resonance range between not less than predetermined value fa1 and not greater than predetermined value fa2 continuously for predetermined time period Δt1, and even-numbered clutch torque T2 detected based on detection value of the torque detector 53 is not less than predetermined value T2a continuously for predetermined time period Δt1, the first mode switching control unit 50A controls the associated control valve 61 and actuator 62, and the power drive unit 4, so as to switch from second speed pre-shift N mode to second speed pre-shift third speed mode (S3 to S7). Therefore, when even-numbered clutch torque T2 is small and resonance does not occur (FIG. 7), needless switching to second speed pre-shift third speed mode can be prevented and second speed pre-shift N mode be longer maintained.

(3) The hybrid vehicle vibration reduction apparatus further includes the vehicle speed detector 54 for detecting vehicle speed v (FIG. 5). When vehicle speed detected by the vehicle speed detector 54 in the second speed pre-shift third speed mode is faster than vehicle speed v1 immediately after switching from the second speed pre-shift N mode to the second speed pre-shift third mode by predetermined value Δv1 or greater, continuously for predetermined time period Δt2, the ECU 50 (second mode switching control unit 50B) controls the associated control valve 61 and actuator 62, and the power drive unit 4, so as to switch from second speed pre-shift third speed mode to second speed pre-shift N mode (FIG. 13A). Therefore, since vibration occurrence condition is not satisfied when shift mode is returned to second speed pre-shift N mode, stable driving in second speed pre-shift N mode can be achieved. More specifically, should the fact that differential rotation frequency fa moved outside resonance range be adopted as mode return condition for switching to second speed pre-shift N mode, switching to second speed pre-shift N mode might occur even in cases of engine speed Ne having increased or decreased owing to engine load fluctuation. In such a case, vibration occurrence condition is apt to be satisfied again and make stable driving in second speed pre-shift N mode difficult. However, when presence and absence of mode return condition is determined based on change amount Δvl of vehicle speed v as in the present embodiment, stable driving in second speed pre-shift N mode unaffected by engine load fluctuation is possible.

(4) The hybrid vehicle vibration reduction apparatus further includes the second mode switching control unit 50B for estimating transmitted torque Tt required to act on the second main input shaft 12 so as to make travelling drive torque Td constant between before and after switching from second speed pre-shift third speed mode to second speed pre-shift N mode, based on even-numbered clutch torque T2 calculated based on detection value of the torque detector 53 (FIG. 5). When estimated value of transmitted torque Tt estimated by the second mode switching control unit 50B is less than predetermined value T2a continuously for predetermined time period Δt3 after shift mode is switched from second speed pre-shift N mode to second speed pre-shift third speed mode, the second mode switching control unit 50B controls the associated control valve 61 and actuator 62, and the power drive unit 4, so as to switch from second speed pre-shift third speed mode to second speed pre-shift N mode to (FIG. 14A). Therefore, since vibration occurrence condition is not satisfied upon return to second speed pre-shift N mode, stable driving in second speed pre-shift N mode is possible.

(5) The hybrid vehicle vibration reduction apparatus further includes the battery 5 for charging power generated by the electric motor 3 and the SOC detector 55 for detecting battery state of charge SOC (amount of charge remaining in the battery 5)(FIGS. 1 and 5). When state of charge SOC detected by the SOC detector 55 is at or less than predetermined value SOC1, the first mode switching control unit 50A prohibits switching from second speed pre-shift N mode to second speed pre-shift third speed mode (FIG. 16). As a result, battery 5 power depletion can be prevented and the battery 5 can be promptly charged to predetermined capacity.

(6) When state of charge SOC detected by the SOC detector 55 in second speed pre-shift third speed mode is at or less than predetermined value SOC1, the second mode switching control unit 50B controls the associated control valve 61 and actuator 62, and the power drive unit 4, so as to switch from second speed pre-shift third speed mode to second speed pre-shift N mode to (FIG. 15A). As a result, charging of the battery 5 by the electric motor 3 is given priority over vibration reduction when battery state of charge SOC is low, thereby preventing vehicle operation problems due to insufficient charging of the battery 5.

(7) The ECU 50 (first mode switching control unit 50A) controls the associated control valve 61 and actuator 62, and the power drive unit 4, so that, in second speed pre-shift N mode, engine torque Te is output to the electric motor 3 through the first main input shaft 11 and is also output to the output shaft 14 through the second main input shaft 12 and the second speed drive gear 22, and in second speed pre-shift third speed mode, engine torque Te is output to the output shaft 14 through the second main input shaft 12 and the second speed drive gear 22 and motor torque Tm is output to the output shaft 14 through the first main input shaft 11 and third speed drive gear 23 (S3 to S7). Therefore, when starting off or driving uphill in second speed or in a similar situation, smooth shifting from second speed to third speed is possible while suppressing resonance of the vehicle body.

Various modifications of the aforesaid embodiment are possible. Some examples are explained in the following. Although in the above embodiment, the odd-numbered stage shift mechanism CM1 having the first main input shaft 11 serving as a first rotating shaft and the odd-numbered stage drive gears 21, 23, 25, and 27 serving as a first gear group is configured as a first shift mechanism, and the even-numbered stage shift mechanism CM2 having the second main input shaft 12 serving as a second rotating shaft and the even-numbered stage drive gears 22, 24, and 26 serving as a second gear group is configured as a second shift mechanism, the first shift mechanism and the second shift mechanism are not limited to these configurations. For example, when an electric motor with power generation capability is connected to the second main input shaft 12, the first shift mechanism can alternatively be configured by the even-numbered stage shift mechanism. Although in the above embodiment, a configuration is adopted that outputs rotation of the odd-numbered stage shift mechanism CM1 and of the even-numbered stage shift mechanism CM2 to the output shaft 14 serving as a third rotating shaft, the third rotating shaft is not limited to this configuration.

Although in the aforesaid embodiment, the first clutch C1 and second clutch C2 are configured by dry clutches, they are not limited to this type and can be of any type capable of connecting and disconnecting an output shaft of a prime mover (engine) and a first rotating shaft and connecting and disconnecting the output shaft of the prime mover and a second rotating shaft, and can, for example, be configured by wet clutches. In the above embodiment, the odd-numbered stage shift mechanism CM1 and the even-numbered stage shift mechanism CM2 are driven by switching the associated control valve 61, and the first clutch C1 and the second clutch C2 are driven by the associated actuator 62. However, a driving part for driving a first shift mechanism, second shift mechanism, first clutch and second clutch are not limited this configuration and the driving part can, for example, include hydraulic cylinders or other such hydraulic actuators.

In the above embodiment, the ECU 50 and the power drive unit 4 serving as a control unit control the control valve 61, the actuator 62 and the electric motor 3 so as to switch shift mode from second speed pre-shift N mode (first mode) to second speed pre-shift third speed mode (second mode) or from second speed pre-shift third speed mode to second speed pre-shift N mode. However, the shift modes are determined by the configuration of the transmission 1 and a first mode and a second mode are not limited to the above modes. Although in the above embodiment, difference between rotational speed of the input shaft of the second clutch C2 and rotational speed of the output shaft of the second clutch C2 is detected based on signals from the first rotational speed detector 51 and the second rotational speed detector 52, a differential rotation detector is not limited to this configuration.

Although in the above embodiment, even-numbered clutch torque T2 as a torque acting on the second rotating shaft is detected based on a signal from the torque detector 53, a torque detector is not limited to this configuration. In the above embodiment, in second speed pre-shift N mode, when differential rotation frequency fa remains in resonance range continuously for predetermined time period Δt1 and even-numbered clutch torque T2 remains in resonance range continuously for predetermined time period Δt1, second speed pre-shift N mode is switched to second speed pre-shift third speed mode. However, this mode shifting can instead be performed solely on condition of differential rotation frequency fa remaining in resonance range continuously for predetermined time period Δt1, and a controller is not limited to the above configuration.

Although in the above embodiment, vehicle speed is detected by the vehicle speed detector 54, a vehicle speed detector can be of any configuration. Although in the above embodiment, the ECU 50 estimates transmitted torque Tt based on a signal from the torque detector 53, controller serving as a torque estimator is not limited to this configuration. Although in the above embodiment, the threshold of even-numbered clutch torque T2 for determining vibration occurrence condition and the threshold of transmitted torque Tt for determining second vibration avoidance condition are set to the same value T2a (FIGS. 11 and 14), the values of these thresholds can be set independently. Although in the above embodiment, power generated in the electric motor 3 is used to charge the battery 5 serving as a secondary battery, and state of charge SOC of the battery 5 (amount of charge remaining in the battery 5) is detected by the SOC detector 55, a charge detector is not limited to this configuration.

The above embodiment can be combined as desired with one or more of the above modifications. The modifications can also be combined with one another.

According to the present invention, in a first mode where a torque of a prime mover is output to an electric motor and a third rotating shaft, when a difference between a rotational speed of an input shaft and a rotational speed of an output shaft of a clutch is within a predetermined range continuously for a predetermined time, operation mode is switched from the first mode to a second mode where torque of the prime mover and the electric motor is output to the third rotating shaft. Therefore, in a case of drive-off or driving while charging power generated in the electric motor, when the differential rotation of the clutch which causes resonance of a vehicle body arises, the operation mode is switched so as to reduce an eigenvalue of a travelling drive system. Therefore, it is possible to prevent the resonance.

Above, while the present invention has been described with reference to the preferred embodiments thereof, it will be understood, by those skilled in the art, that various changes and modifications may be made thereto without departing from the scope of the appended claims.

What is claimed is:

1. A vibration reduction apparatus of a hybrid vehicle, comprising:
   a prime mover;
   a first shift mechanism including a first rotating shaft and a plurality of gears contained in a first gear group, and configured to output a rotation of the first rotating shaft to a third rotating shaft through any of the plurality of gears contained in the first gear group to shift a gear ratio;
   a second shift mechanism including a second rotating shaft and a plurality of gears contained in a second gear group, and configured to output a rotation of the second rotating shaft to the third rotating shaft through any of the plurality of gears contained in the second gear group to shift the gear ratio;
   a first clutch configured to connect or disconnect an output shaft of the prime mover and the first rotating shaft to transmit or non-transmit a torque of the prime mover to the first rotating shaft;
   a second clutch configured to connect or disconnect the output shaft of the prime mover and the second rotating shaft to transmit or non-transmit the torque of the prime mover to the second rotating shaft;
   an electric motor connected to the first rotating shaft, the electric motor being capable of generating electricity;
   a driving part configured to drive the first shift mechanism, the second shift mechanism, the first clutch and the second clutch;
   a controller configured to control the driving part and the electric motor so that, in a first mode, the torque of the prime mover is output to the electric motor through the first rotating shaft and is output to the third rotating shaft through the second shift mechanism, and in a second mode, the torque of the prime mover is output to the third rotating shaft through the second shift mechanism and a torque of the electric motor is output to the third rotating shaft through the first shift mechanism; and
   a differential rotation detector configured to detect a difference between a rotational speed of the output shaft of the prime mover and a rotational speed of the second rotating shaft,
   wherein the controller controls the driving part and the electric motor so as to switch an operation mode from the first mode to the second mode, when the difference detected by the differential rotation detector in the first mode is within a predetermined range continuously for a predetermined time.

2. The apparatus according to claim 1, further comprising a torque detector configured to detect a torque acting on the second rotating shaft,
   wherein the controller controls the driving part and the electric motor so as to switch the operation mode from the first mode to the second mode, when in the first mode, the difference detected by the differential rotation detector is within the predetermined range continuously for the predetermined time and the torque detected by the torque detector is more than or equal to a predetermined value continuously for the predetermined time.

3. The apparatus according to claim 1, further comprising a vehicle speed detector configured to detect a vehicle speed,
   wherein the controller controls the driving part and the electric motor so as to switch the operation mode from the second mode to the first mode, when a vehicle speed detected by the vehicle speed detector in the second mode is faster than a vehicle speed immediately after switching the operation mode from the first mode to the second mode by a predetermined value or greater, continuously for the predetermined time.

4. The apparatus according to claim 2, wherein the controller estimates a torque value required to act on the second rotating shaft so as to make a travelling drive torque constant between before and after switching the operating mode from the second mode to the first mode, and controls the electric motor so as to switch the operating mode from the second mode to the first mode, when the torque value estimated by the controller is less than a predetermined value continuously for a predetermined time after switching the operating mode from the first mode to the second mode.

5. The apparatus according to claim 1, further comprising:
a secondary battery configured to charge an electric power generated in the motor; and
a charge detector configured to detect an amount of charge remaining in the secondary battery,
wherein the controller prohibits switching the operating mode from the first mode to the second mode, when the amount of charge detected by the charge detector is less than or equal to a predetermined value.

6. The apparatus according to claim 5, wherein the controller controls the driving part and the electric motor so as to switch the operation mode from the second mode to the first mode, when the amount of charge detected by the charge detector is less or equal to a predetermined value.

7. The apparatus according to claim 1, wherein the first gear group includes a drive gear for an odd-numbered speed and the second gear group includes a drive gear for an even-numbered speed, and
the controller controls the driving part and the electric motor so that, in the first mode, the torque of the prime mover is output to the electric motor through the first rotating shaft and is output to the third rotating shaft through the second rotating shaft and a second speed drive gear, and in the second mode, the torque of the prime mover is output to the third rotating shaft through the second rotating shaft and the second speed drive gear and the torque of the electric motor is output to the third rotating shaft through the first rotating shaft and a third speed drive gear.

8. A vibration reduction method of a hybrid vehicle, the hybrid vehicle comprising:
a prime mover;
a first shift mechanism including a first rotating shaft and a plurality of gears contained in a first gear group, and configured to output a rotation of the first rotating shaft to a third rotating shaft through any of the plurality of gears contained in the first gear group;
a second shift mechanism including a second rotating shaft and a plurality of gears contained in a second gear group, and configured to output a rotation of the second rotating shaft to the third rotating shaft through any of the plurality of gears contained in the second gear group;
a first clutch configured to connect or disconnect an output shaft of the prime mover and the first rotating shaft to transmit or non-transmit a torque of the prime mover to the first rotating shaft;
a second clutch configured to connect or disconnect the output shaft of the prime mover and the second rotating shaft to transmit or non-transmit the torque of the prime mover to the second rotating shaft; and
an electric motor connected to the first rotating shaft, the electric motor being capable of generating electricity,
the method comprising:
controlling the first shift mechanism, the second shift mechanism, the first clutch and the second clutch so that, in a first mode, the torque of the prime mover is output to the electric motor through the first rotating shaft and is output to the third rotating shaft through the second shift mechanism, and in a second mode, the torque of the prime mover is output to the third rotating shaft through the second shift mechanism and a torque of the electric motor is output to the third rotating shaft through the first shift mechanism;
detecting a difference between a rotational speed of the output shaft of the prime mover and a rotational speed of the second rotating shaft; and
switching an operation mode from the first mode to the second mode, when the difference detected in the first mode is within a predetermined range continuously for a predetermined time.

\* \* \* \* \*